(12) United States Patent  (10) Patent No.: US 7,896,127 B2
Sato et al.  (45) Date of Patent: Mar. 1, 2011

(54) MUFFLER UNIT FOR GENERAL-PURPOSE ENGINE

(75) Inventors: Yoshikazu Sato, Wako (JP); Kazuhiro Sakamoto, Wako (JP); Gaku Naoe, Wako (JP); Souhei Honda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 199 days.

(21) Appl. No.: 11/913,144

(22) PCT Filed: Jun. 16, 2006

(86) PCT No.: PCT/JP2006/312564
§ 371 (c)(1),
(2), (4) Date: Sep. 18, 2008

(87) PCT Pub. No.: WO2006/137506
PCT Pub. Date: Dec. 28, 2006

(65) Prior Publication Data
US 2009/0038879 A1 Feb. 12, 2009

(30) Foreign Application Priority Data

Jun. 23, 2005 (JP) ................ 2005-182770
Jun. 23, 2005 (JP) ................ 2005-182891
Jun. 23, 2005 (JP) ................ 2005-183214

(51) Int. Cl.
*F01N 13/10* (2010.01)
*F01N 1/08* (2006.01)
*F01N 13/08* (2010.01)

(52) U.S. Cl. .......... 181/240; 181/268; 181/272; 181/275
(58) Field of Classification Search ............ 181/240, 181/231, 268, 269, 272, 275, 281, 227, 228, 181/264; 60/299, 312, 322, 314; 173/DIG. 2
See application file for complete search history.

(56) References Cited

U.S. PATENT DOCUMENTS 3,168,936 A * 2/1965 Gordon .................. 181/269
(Continued)

FOREIGN PATENT DOCUMENTS

JP 59-194521 U 12/1984
(Continued)

OTHER PUBLICATIONS

International Search Report of PCT/JP2006/312564, date of mailing Jan. 17, 2007.

*Primary Examiner* — Edgardo San Martin
(74) *Attorney, Agent, or Firm* — Westerman, Hattori, Daniels & Adrian, LLP

(57) ABSTRACT

A muffler unit for a general-purpose engine includes a muffler (40) having a maze of sound-deadening chambers (101, 102, 103) defined therein and an inlet pipe (85) disposed inside the muffler. The inlet pipe has an open end (106) connected to an exhaust port of the engine via an exhaust pipe (43), a closed end (107) opposite to the open end, and perforations (108) provided near the open end and connecting an internal space of the inlet pipe and a first sound-deadening chamber (101). The closed end of the inlet pipe is exposed to the outside air, so that exhaust gasses are cooled when the gasses impinge on the closed end of the inlet pipe.

22 Claims, 18 Drawing Sheets

U.S. PATENT DOCUMENTS

| | | | | |
|---|---|---|---|---|
| 3,378,099 | A | * 4/1968 | Gordon | 181/240 |
| 3,650,354 | A | * 3/1972 | Gordon | 181/240 |
| 3,685,613 | A | 8/1972 | Snodgrass et al. | |
| 3,968,854 | A | * 7/1976 | Gordon et al. | 181/269 |
| 4,388,804 | A | * 6/1983 | Bushmeyer | 60/319 |
| 4,854,417 | A | * 8/1989 | Uesugi et al. | 181/272 |
| 4,890,690 | A | 1/1990 | Fischer et al. | |
| 4,972,921 | A | * 11/1990 | Takada et al. | 181/282 |
| 5,206,467 | A | * 4/1993 | Nagai et al. | 181/232 |
| 5,338,903 | A | * 8/1994 | Winberg | 181/231 |
| 5,373,119 | A | 12/1994 | Suzuki et al. | |
| 5,722,237 | A | * 3/1998 | Iida et al. | 60/302 |
| 5,732,555 | A | 3/1998 | Gracyalny et al. | |
| 5,959,263 | A | * 9/1999 | Foltz, Jr. | 181/254 |
| 6,076,632 | A | * 6/2000 | Schuhmacher et al. | 181/282 |
| 6,241,044 | B1 | * 6/2001 | Nishiyama et al. | 181/272 |
| 6,250,422 | B1 | * 6/2001 | Goplen et al. | 181/272 |
| 6,393,835 | B1 | * 5/2002 | Stoll et al. | 60/299 |
| 6,457,553 | B1 | * 10/2002 | Goplen et al. | 181/272 |
| 6,789,644 | B2 | * 9/2004 | Mukaida | 181/272 |
| 6,941,919 | B2 | * 9/2005 | Chiba et al. | 123/195 A |
| 6,978,605 | B2 | * 12/2005 | Chiba et al. | 60/302 |
| 7,293,629 | B2 | * 11/2007 | Nasuno et al. | 181/231 |
| 7,296,657 | B2 | * 11/2007 | Ohno et al. | 181/272 |

FOREIGN PATENT DOCUMENTS

| | | | |
|---|---|---|---|
| JP | 2-99214 U | | 8/1990 |
| JP | 04325709 A | * | 11/1992 |
| JP | 05288047 A | * | 11/1993 |
| JP | 10121958 A | * | 5/1998 |
| JP | 2003-97289 A | | 4/2003 |
| JP | 2004-124883 A | | 4/2004 |
| JP | 2005-201135 A | | 7/2005 |

\* cited by examiner

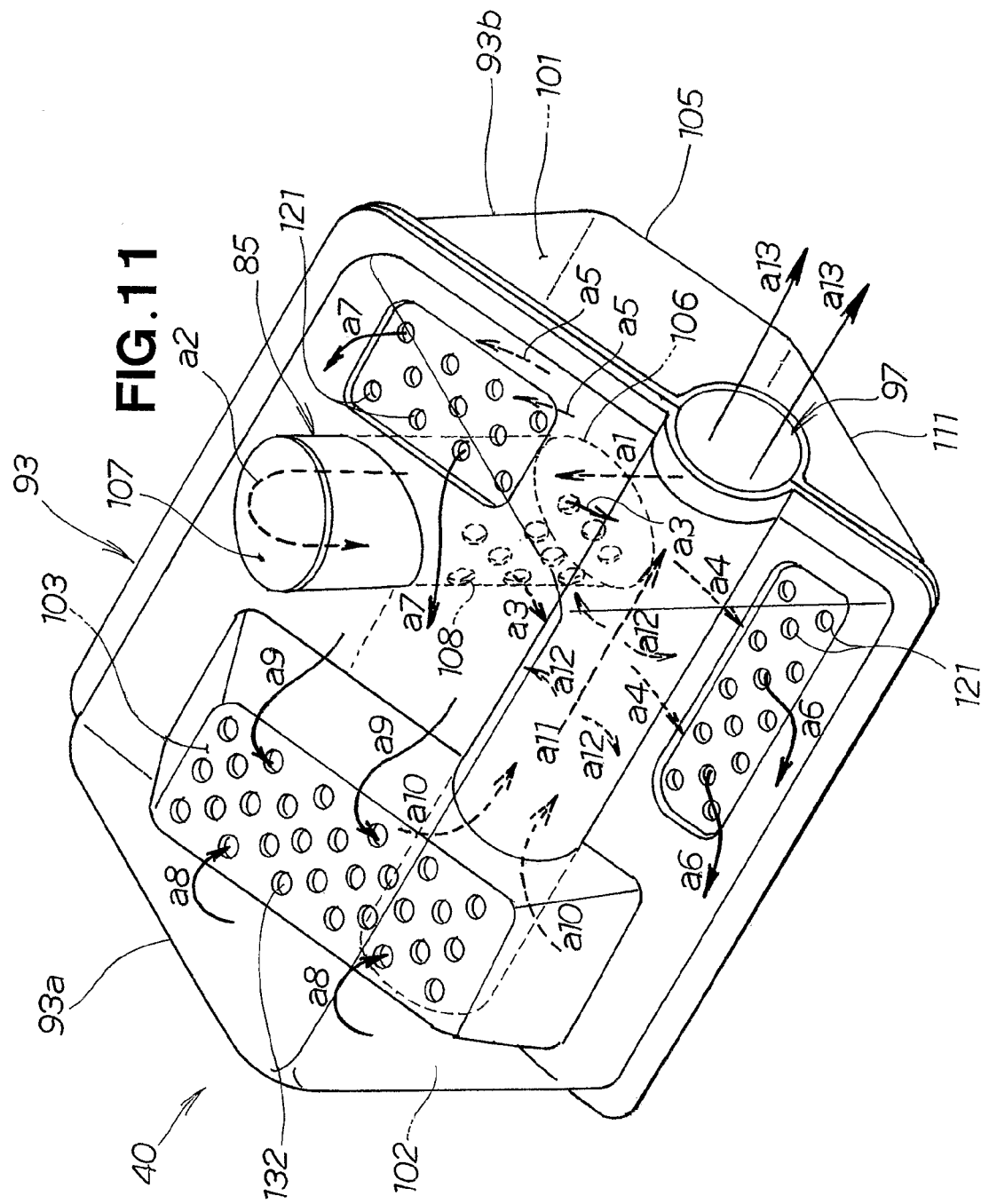

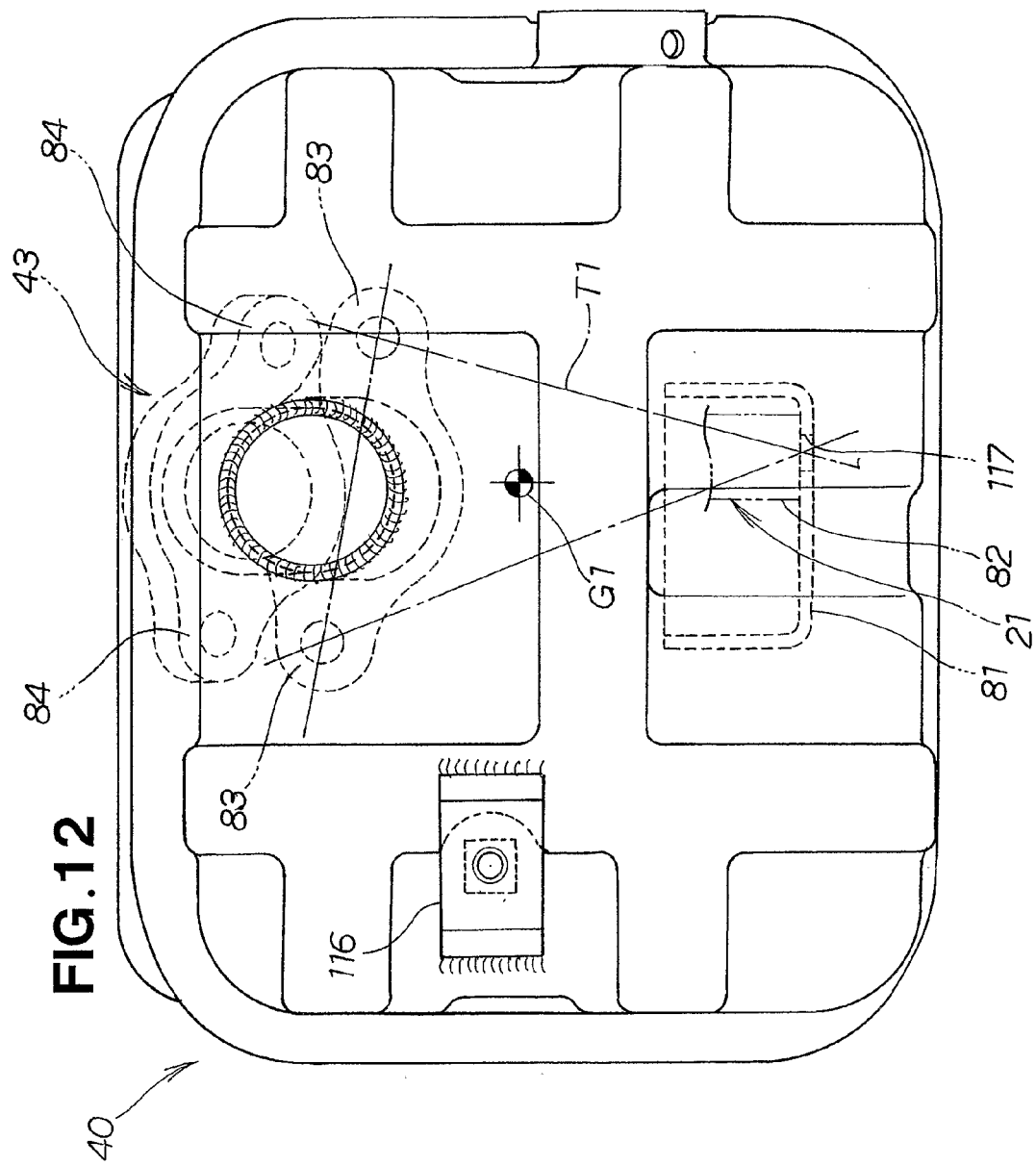

(INVENTION)

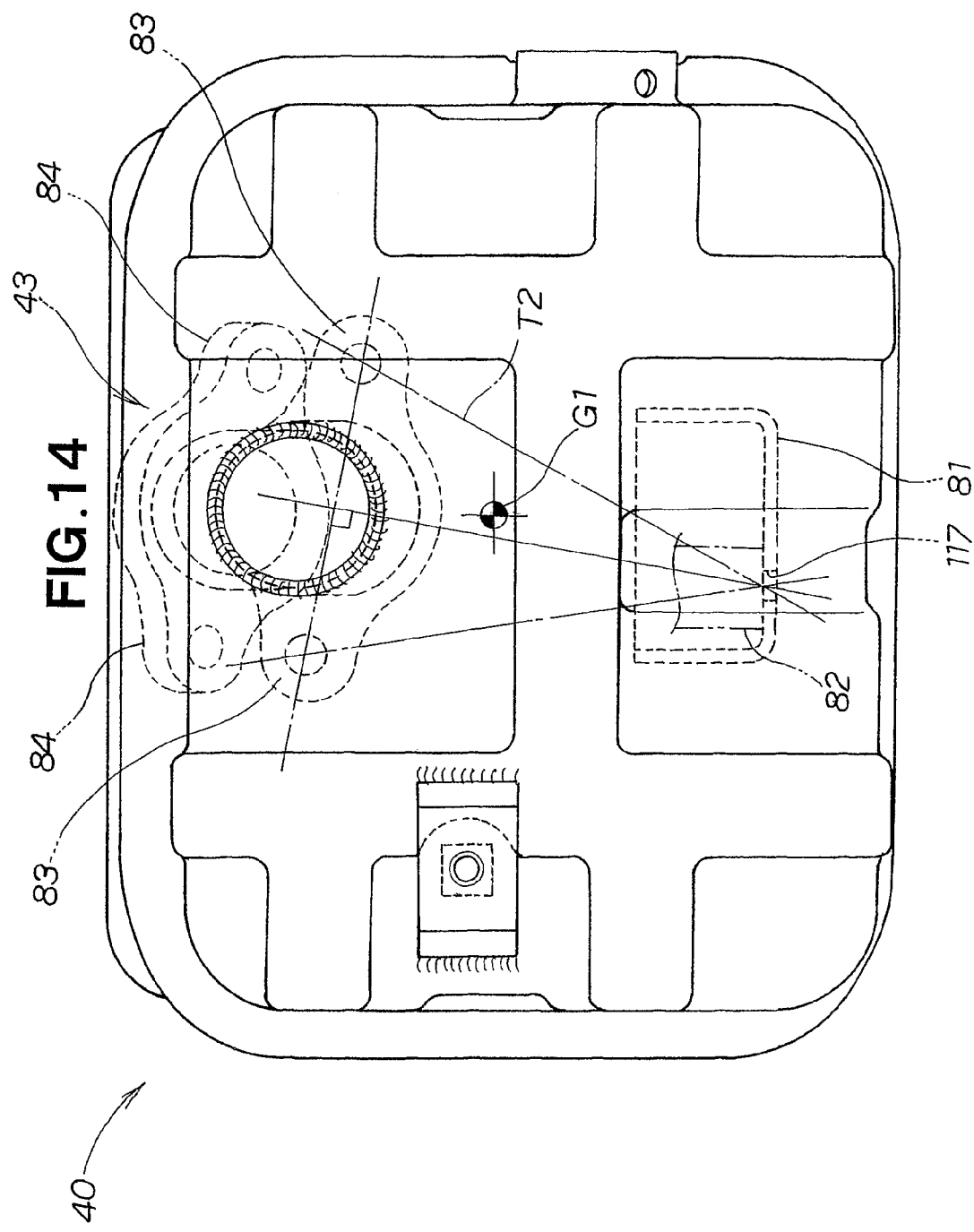

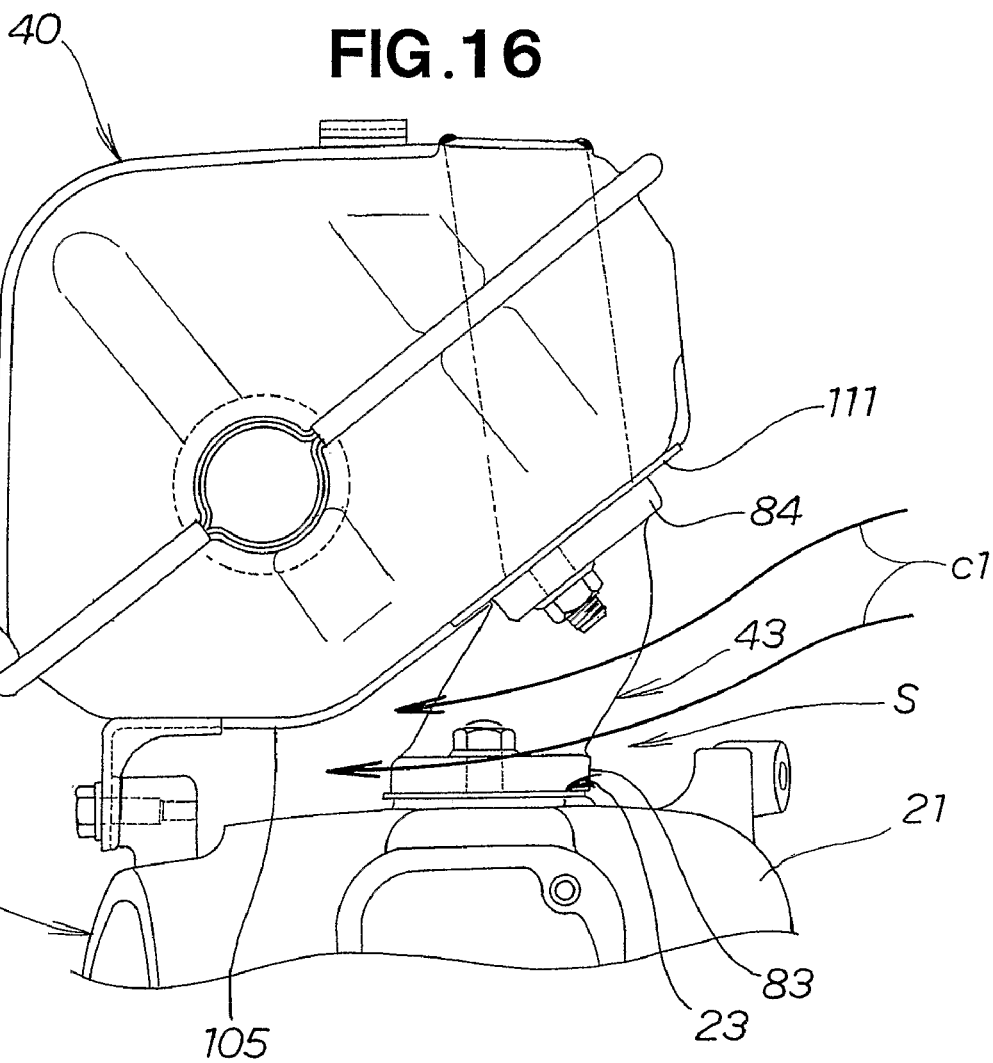

US 7,896,127 B2

MUFFLER UNIT FOR GENERAL-PURPOSE ENGINE

TECHNICAL FIELD

The present invention relates to a muffler unit for general-purpose engines, and more particularly to such a muffler unit including a muffler connected to an exhaust port of the engine via an exhaust pipe.

BACKGROUND ART

Muffler units used in general-purpose engines are known as disclosed, for example, in Japanese Utility Model Publication (JP-UM-A) No. 2-99214, Japanese Patent Publication (JP-A) No. 2003-097289, and Japanese Utility Model Publication (JP-UM-A) No. 59-194521.

FIG. 17 hereof illustrates a muffler unit disclosed in JP-UM-A 2-99214. As shown in this figure, the disclosed muffler unit includes a muffler 300 having a pair of housing members 301 and 302 connected together with a partition wall 303 disposed therebetween. The muffler 300 has two sound-deadening chambers 304, 305 defined therein on opposite sides of the partition wall 303. The housing member 304 has an inlet opening 308 through which the first chamber 304 communicates with an exhaust port 307 of a general-purpose engine 306. The partition wall 303 has a dome-like recessed portion 311 facing the inlet opening 308, and a plurality of lancet holes 312 through which the first and second sound-deadening chambers 304, 305 communicate with each other. The second sound-deadening chamber 305 is open to the outside air through a tail pipe 109

With the muffler unit thus arranged, when exhaust gasses are routed to pass through the first and second chambers 304, 305 via the lancet holes 312, the speed and pressure of the gasses drop and the sound level is reduced. In this instance, however, since the dome-like recessed portion 311 is formed as an integral part of the partition wall 303 disposed inside the muffler 300, it is not expected at all for the muffler 300 to provide substantive reduction of exhaust sound by performing effective cooling of exhaust gasses while the gasses pass through the muffler 300.

FIG. 18 hereof illustrates a muffler unit disclosed in JP-UM-A 59-194521. As shown in this figure, the muffler unit includes a muffler 333 and an exhaust pipe 334 connected at one end to the muffler 333 and at the other end to an exhaust port 332 of a general purpose engine 311. The exhaust pipe 334 has an intermediate portion secured by a pair of screws 335 to a portion of the engine 311 including the exhaust port 332.

With this arrangement, since the muffler 333 is supported by the exhaust pipe 334 in a cantilevered fashion, the muffler 333 is likely to cause undue oscillation, which may generate unpleasant oscillation noise. An attempt may be made to increase the rigidity of the exhaust pipe 334 and a joint between the exhaust pipe and the engine body, however, attempted strengthening would increase the overall weight and size of the general-purpose engine 311 including the muffler unit.

FIG. 19 hereof illustrates a muffler unit disclosed in JP-A 2003-097289. As shown in this figure, the muffler unit includes a muffler 343 and an exhaust pipe 344 connected at one end to the muffler 343 and at the other end to an exhaust port 342 of a general purpose engine 341. The muffler 343 is also supported in a cantilevered fashion by the exhaust pipe 344 and hence is likely to undergo oscillating movement about the proximal end of the exhaust pipe 344 secured to the engine body. Furthermore, the muffler 343 is disposed above a cylinder block 347 of the engine 341 and is secured to a distal end of the exhaust pipe 344 by means of screws (not shown) extending in a vertical plane. With this arrangement, there is provided between the muffler 343 and the cylinder block 347 only a small space which is available for attachment of the muffler 343 and the exhaust pipe 344 by means of the non-illustrated screws. Thus, the efficiency of a muffler mounting operation using such small space is very low.

In view of the foregoing difficulties of the conventional device, it is desirable to provide a muffler unit for a general-purpose engine, which is able to perform effective cooling of exhaust gasses and thus achieving substantive reduction of the exhaust sound while the gasses are routed to pass through the muffler, is unlikely to cause undue oscillation which would otherwise result in generation of unpleasant oscillation noise, and can be attached to the engine body with increased efficiency.

DISCLOSURE OF THE INVENTION

According to a first aspect of the present invention, there is provided a muffler unit for a general-purpose engine including an engine body having an exhaust port, the muffler unit comprising: an exhaust pipe having a first end adapted to be connected to the exhaust port of the engine body and a second end opposite to the first end; and a muffler having a maze of sound-deadening chambers defined therein and an inlet pipe disposed inside the muffler, the inlet pipe having an open end connected to the second end of the exhaust pipe and a closed end opposite to the open end, the closed end of the inlet pipe being exposed to the outside air, the inlet pipe further having a group of perforations formed therein to connect an internal space of the inlet pipe in fluid communication with a first sound-deadening chamber of the maze of sound-deadening chambers, the perforations being located closer to the open end than to the closed end of the inlet pipe.

With this arrangement, since the closed end of the inlet pipe is exposed to the outside air whose temperature is much lower than a temperature of exhaust gasses, the exhaust gasses are cooled when the gasses impinge on the closed end of the inlet pipe. By thus cooling the exhaust gasses, thermal energy of the exhaust gasses is considerably reduced. This is particularly effective to lower the exhaust sound level.

Preferably, the closed end of the inlet pipe projects outwardly from an outside surface of the muffler. The thus projecting closed end of the inlet pipe has a relatively large surface area and hence is able to perform enhanced cooling of the exhaust gasses.

The exhaust pipe may have a bent portion so configured as to guide exhaust gasses to advance along one side of the inlet pipe until the gasses impinge on the closed end of the inlet pipe. By thus guiding the exhaust gasses, the gasses can readily make a U turn at the closed end of the inlet pipe. Thus, the exhaust gasses that have been cooled at the closed end of the inlet pipe come in direct contact with exhaust gasses just introduced in the inlet pipe and advancing toward the closed end of the inlet pipe. Such direct contact occurring between the cooled exhaust gasses and the un-cooled exhaust gasses offers further reduction of thermal energy of the exhaust gasses, leading to further reduction of the exhaust sound.

It is preferable that the one side of the inlet pipe along which the exhaust gasses are guided to advance is free from perforations. This arrangement ensures that most part of the exhaust gasses is allowed to bypass the perforations as the gasses advance toward the closed end of the inlet pipe.

The muffler may further include an outlet pipe disposed therein for discharging exhaust gasses from a last sound-deadening chamber of the maze of sound-deadening chambers to the outside of the muffler. The inlet pipe and the outlet pipe are disposed perpendicularly to each other. By thus arranging the inlet pipe and the outlet pipe in mutual perpendicular orientation, it is possible to provide a long flow path for the exhaust gasses without incurring an increase in the weight, size or cost of the muffler.

In one preferred form of the invention, the muffler has a single first attachment portion adapted to be attached to the engine body, and the first end of the exhaust pipe has a second attachment portion and a third attachment portion that are disposed symmetrically with respect to a central axis of the exhaust pipe for attachment to the exhaust port of the engine body. In a plan view, the first, second and third attachment portions are located at respective corners of a triangle, and the muffler has a center of gravity disposed inside the triangle. By thus arranging the first, second and third attachment portions and the center of gravity of the muffler, the muffler unit including the muffler and the exhaust pipe is mounted to the engine body via a three-point mount system, and the weight of the muffler can be almost evenly born by the first, second and third attachment portions. The thus mounted muffler is highly stable in position and unlikely to undergo oscillating movement which may lead to generation of unpleasant oscillation noise.

Preferably, the second end of the exhaust pipe has a pair of attachment portions disposed symmetrically with respect to the central axis of the exhaust pipe, and in a plan view, the attachment portions of the second end are disposed outside the triangle and offset from the second and third attachment portions of the first end in a direction away from the first attachment portion of the muffler. By thus offsetting the attachment portions at the second end of the exhaust pipe relative to the second and third attachment portions at the first end of the exhaust pipe, the exhaust pipe has an increased degree of rigidity and hence is able to keep the muffler substantially free from oscillation.

The triangle that is drawn or formed by three straight lines interconnecting the first, second and third attachment portions may be an isosceles triangle, and the first attachment portion of the muffler is located at an apex angle of the isosceles triangle. This arrangement is particularly advantageous in that the weight of the muffler is almost evenly supported or born by the first, second and third attachment portions.

Preferably, the muffler has a support bracket formed integrally therewith and forming the first attachment portion.

The muffler may have an inclined bottom wall portion sloping upward so as to define, between the inclined bottom wall portion and a portion of the engine body including the exhaust port, a space of generally triangular configuration within which the exhaust pipe is disposed. By virtue of a peculiar shape of the triangular space, a large end of the triangular space S provides a larger opening than a small end and hence accepts a larger amount of air than the small end. Thus, the outside air tends to creates a stream of air flowing from the large end into the triangular space and leaving the triangular space from the small end. The exhaust pipe is cooled by the outside air as it passes through the triangular space. Since the temperature of the exhaust gasses is highest at the exhaust pipe, cooling of the exhaust pipe by the stream of outside air is highly effective to reduce thermal energy of the exhaust gasses, which will lead to a reduction of the exhaust sound.

Preferably, the inclined bottom wall portion partially defines the first sound-deadening chamber of the muffler. With this arrangement, since the inclined bottom wall portion is also cooled by the stream of outside air, a further reduction of the thermal energy can be achieved as the exhaust gasses pass through the first sound-deadening chamber partially defined by the thus cooled inclined bottom wall portion.

The muffler may have a partition wall disposed therein to separate an internal space of the muffler into the first sound-deadening chamber and a second sound-deadening chamber, the partition wall extending substantially parallel to the inclined bottom wall portion of the muffler. By thus arranging the partition wall in parallel to the inclined bottom wall portion of the muffler, it is readily possible to provide two sound-deadening chambers of the same size or capacity on opposite sides of the partition wall. This arrangement is particularly effective to enhance sound-deadening efficiency of the muffler.

In one preferred form of the invention, the engine body has a plurality of first stud bolts disposed around the exhaust port in symmetric relation to one another about a center axis of the exhaust port and projecting upwardly from the engine body for connection of the first end of the exhaust pipe relative to the exhaust port, and the muffler has a plurality of second stud bolts disposed around the open end of the inlet pipe in symmetric relation to one another about a central axis of the inlet pipe and projecting perpendicularly from the inclined bottom wall portion of the muffler for connection of the second end of the exhaust pipe relative to the muffler. Each of the first stud bolts and a corresponding one of the second stud bolts are out of vertical alignment with each other and extend at an angle to each other.

With this angled arrangement of the first and second stud bolts, a tool used for tightening a nut onto a corresponding one of the first stud bolts can be smoothly-placed or set in an operating position without interference with the nuts already tightened onto the second stud bolts.

Preferably, each of the second stud bolts is offset from a corresponding one of the first stud bolts in a direction toward a large end of the triangular space. This arrangement allows a human operator to achieve temporarily tightening of the nuts onto the mating stud bolts without interference with neighboring parts. Thus, the muffler can be mounted on the engine body with increased efficiencies.

According to a second aspect of the present invention, there is provided a muffler unit for a general-purpose engine including an engine body having an exhaust port, the muffler unit comprising: an exhaust pipe having a first end adapted to be connected to the exhaust port of the engine body and a second end opposite to the first end; and a muffler connected to the second end of the exhaust pipe and having a single first attachment portion adapted to be connected to the engine body, wherein the first end of the exhaust pipe has a second attachment portion and a third attachment portion that are disposed symmetrically with respect to a central axis of the exhaust pipe for attachment to a portion of the engine body including the exhaust port, and wherein in a plan view, the first, second and third attachment portions are located at respective corners of a triangle, and the muffler has a center of gravity disposed inside the triangle.

By thus arranging the first, second and third attachment portions and the center of gravity of the muffler, the muffler unit including the muffler and the exhaust pipe is mounted to the engine body via a three-point mount system, and the weight of the muffler can be almost evenly supported or born by the first, second and third attachment portions. The thus mounted muffler is highly stable in position and unlikely to undergo oscillating movement, which may result in generation of unpleasant oscillation noise. Obviously, the muffler unit constructed in accordance with second aspect of the invention may be modified in the same manner as done in and previously described above with respect to the muffler unit according to the first aspect of the invention.

BRIEF DESCRIPTION OF THE DRAWINGS

FIG. 11 is a perspective view of the muffler illustrative of the manner in which exhaust gasses are routed to pass through the muffler;

FIG. 12 is a plan view of the muffler, illustrative of the manner in which the muffler is mounted to the engine body via a three-point mount system;

FIG. 14 is a plan view showing a muffler mounting structure according to a modification of the present invention;

FIG. 16 is an enlarged view of FIG. 15B, showing a cooling effect attained by the muffler unit.

BEST MODE FOR CARRYING OUT THE INVENTION

One preferred embodiment of the present invention will be described below in greater detail with reference to the accompanying sheets of drawings.

Figure 1:
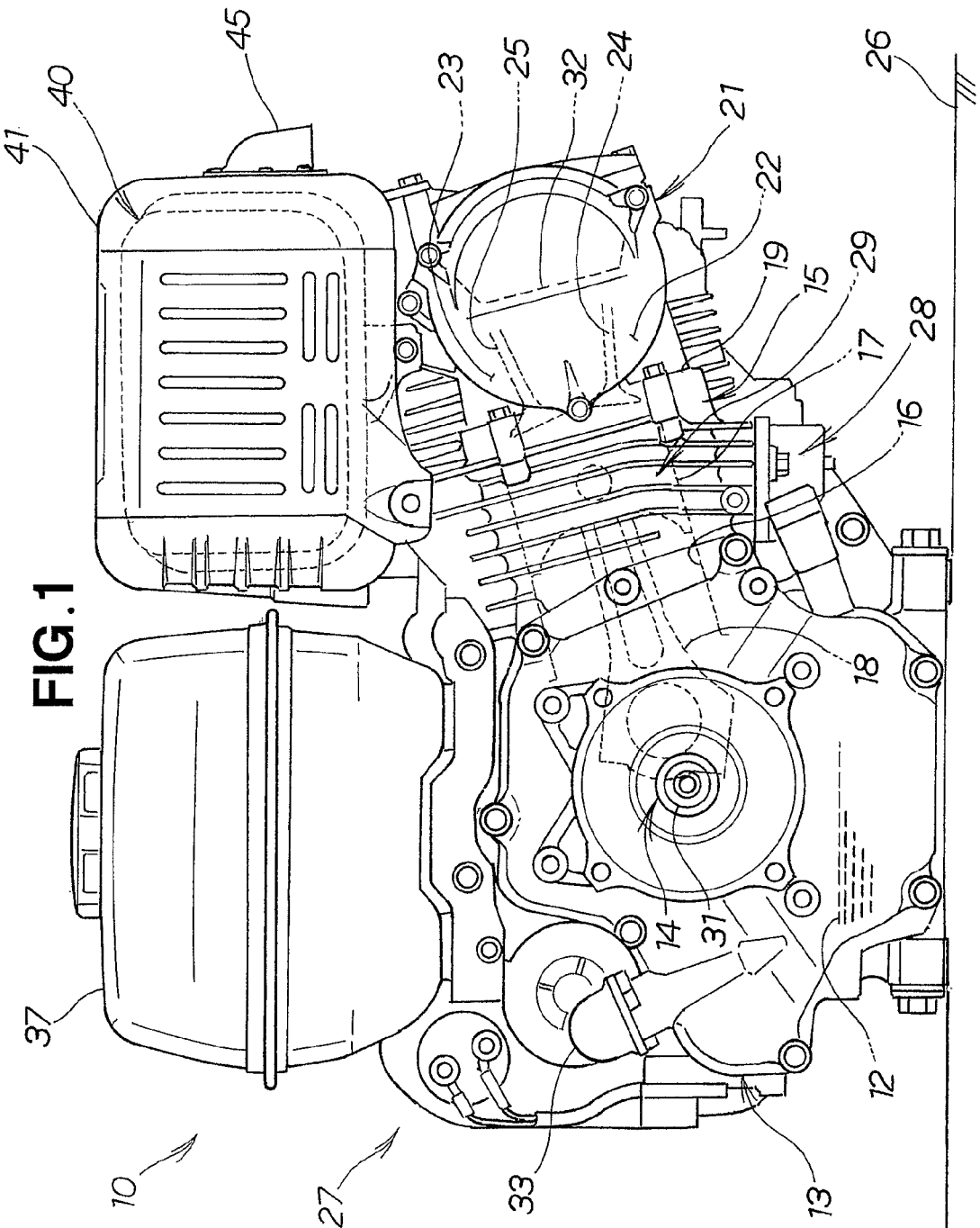
FIG. 1 is a front elevational view of a general-purpose engine equipped with a muffler unit according to the present invention.
Figure 2:
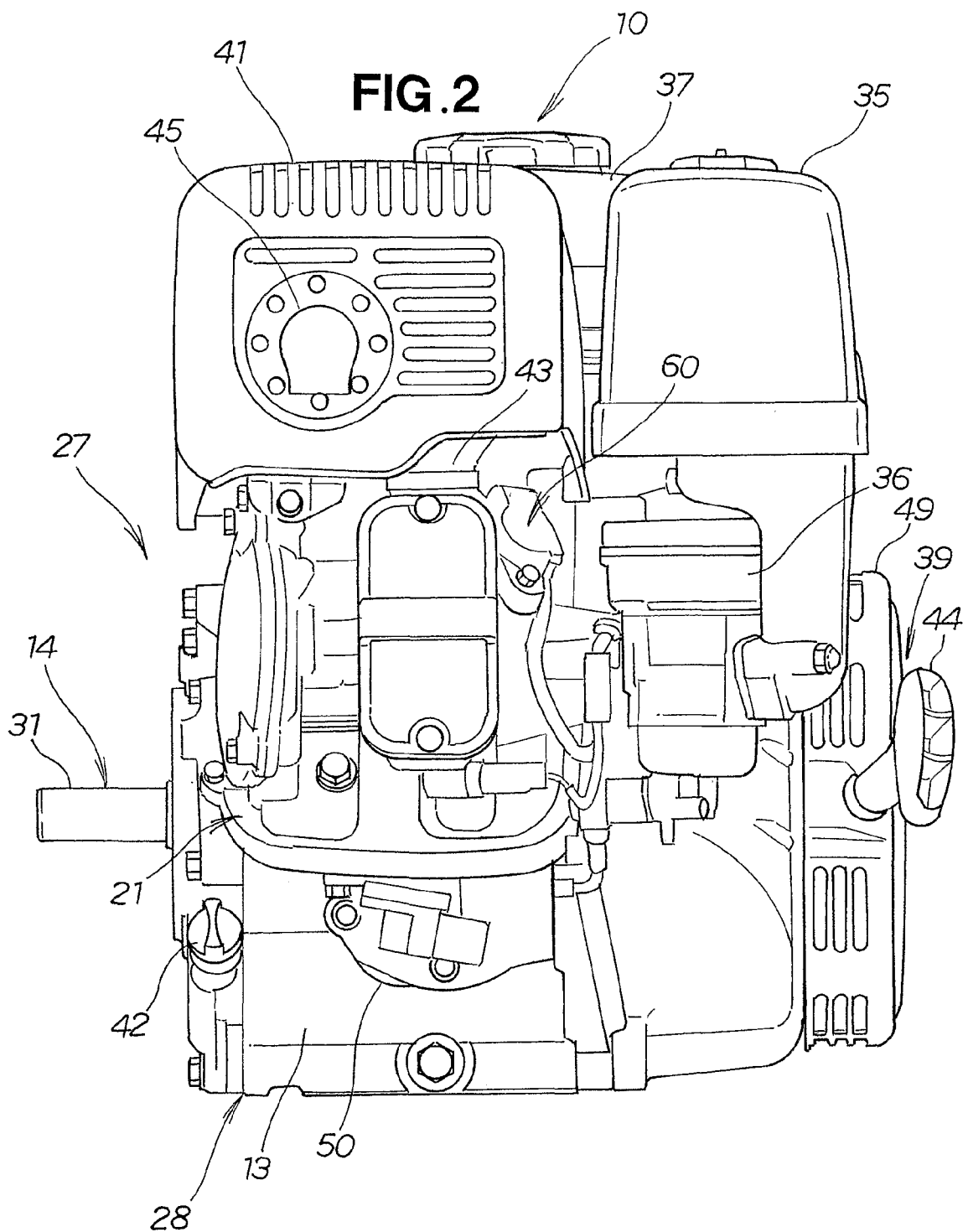
FIG. 2 is a right side view of FIG. 1.
Figure 3:
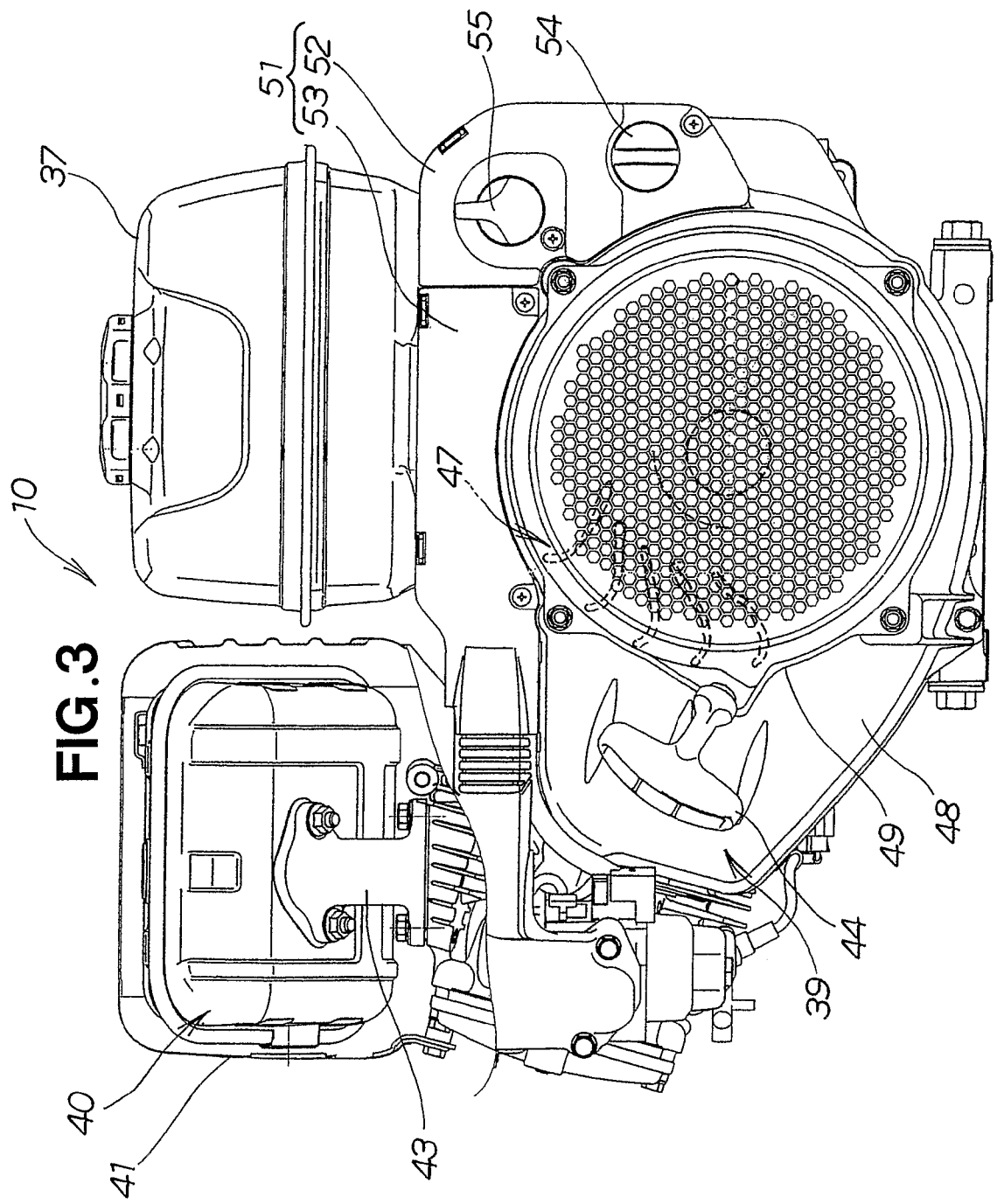
FIG. 3 is a rear elevational view of FIG. 1.

FIGS. 1 to 3 show a general-purpose engine 10 equipped with a muffler unit according to an embodiment of the present invention. The engine 10 generally comprises an engine body 27 and auxiliary devices associated with the engine body 27 for operation of the engine 10.

As shown in FIG. 1, the engine body 27 is of the so-called "air-cooled inclined single-cylinder overhead camshaft (OHC)" type and includes a crankcase 13 for holding therein a lubricating oil 12, a crankshaft (output shaft) 14 mounted horizontally and rotatably on the crankcase 13, a single cylinder block 15 formed in one piece with the crankcase 13 and inclined to the vertical, a reciprocating piston 17 slidably received in a cylinder 16 formed in the cylinder block 15, a connecting rod 18 forming a link between the piston 17 and the crankshaft 14, a cylinder head 21 mounted to close an open end 19 of the cylinder block 15, an inlet valve 24 for opening and closing an inlet port 22 of the cylinder head 21, and an exhaust valve 25 for opening and closing an outlet port 23 of the cylinder head 21.

The crankcase 13, cylinder block 15 and cylinder head 21 together constitute a casing 28 of the engine body 27. The cylinder block 21, cylinder head 21 and piston 17 jointly define therebetween a combustion chamber 29. The cylinder head 21 has a valve chamber 32 in which a valve drive mechanism is disposed for driving the inlet and exhaust valves 24, 25 in timed relation to one another in response to rotation of the crankshaft 14. The crankshaft 14 has a power take-off portion 31 at one end thereof.

In FIG. 1, reference numeral 33 denotes an oil level gauge; 41, a muffler cover; 45, a tailpipe 45 connected to the muffler cover 41 and forming a discharge end of an exhaust system of the engine 10; and 26, a ground surface on which the engine 10 is disposed.

The auxiliary devices comprise a carburetor 36 (FIG. 2) for mixing vaporized fuel with air to form a combustible mixture which is supplied to the inlet port 24 (FIG. 1) of the engine body 27, an air cleaner 35 (FIG. 2) for filtrating dust and dirt out of the air which is drawn into the carburetor 36, a fuel tank 37 in which the fuel is stored, a muffler 40 (FIG. 1) for reducing or deadening exhaust noise of the engine 10, a recoil starter 39 (FIG. 2) for starting the engine 10, an oil alert 50 (FIG. 2) for detecting a level of the lubricating oil 12 held inside the crankcase 13, and an ignition device 60 (FIG. 2). The lubricating oil 12 is supplied from an oil filler port 42 (FIG. 12) into the crankcase 13. The oil filler port 42 is normally closed by a filler cap.

As shown in FIG. 3, a cooling fan 47 is fixedly mounted on the opposite end of the crankshaft 14. Though not shown, a dynamo-electric generator is also connected in driven relation to the opposite end of the crankshaft 14. The generator is disposed inwardly of the cooling fan 47. The cooling fan 47 is covered by a fan cover 48 attached to the engine body 27 (FIGS. 1 and 2). The recoil starter 39 (FIGS. 2 and 3) is covered by a recoil starter cover 49 and has a starter knob 44 adapted to be actuated or pulled by a human operator when the engine 10 is to be started. The muffler 40 is connected to the inlet port 22 (FIG. 1) of the engine body 27 via an exhaust pipe 43, and the muffler cover 41 covers the muffler 40 and the exhaust pipe 43. The muffler 40 and the exhaust pipe 43 connected thereto form a muffler unit according to the present invention.

The general-purpose engine 10 also has an operation panel 51 formed jointly by a main panel 52 and a cover panel 53, as shown in FIG. 3. The main panel 52 is disposed on an upper right side of the recoil starter cover 49 and includes a switching knob 54 and a regulating knob 55 provided thereon. The switching knob 54 is manually operable to place the engine 10 in an ON state, and the regulating knob 55 is manually operable to regulate a governor motor (not shown) associated with the carburetor 36 (FIG. 2). The cover panel 53 is contiguous with the main panel 52 and extends vertically between the fuel tank 37 and the recoil starter cover 49.

Figure 4:
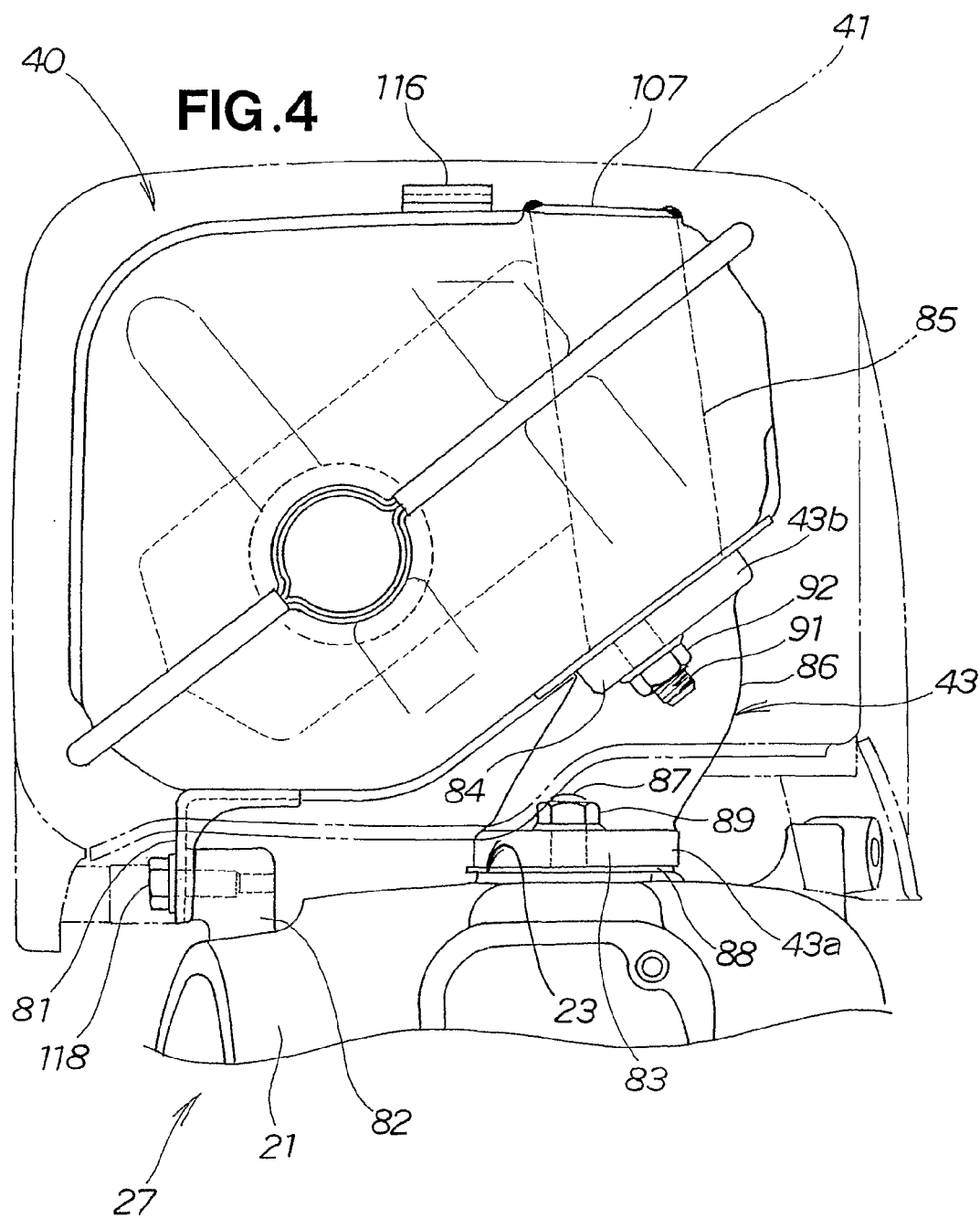
FIG. 4 is a side view of a part of the general-purpose engine shown with the muffler unit attached to an engine body.

As shown in FIG. 4, the muffler 40 is connected to the exhaust port 23 of the engine body 27 via the exhaust pipe 43. The muffler 40 is also connected to the engine body 27 via an L-shaped support stay (first attachment portion) 81 extending from a bottom wall of the muffler 40 and connected by a screw 118 to a muffler retaining portion or lug 82 provided on the cylinder head 21 of the engine body 27.

Figure 5:
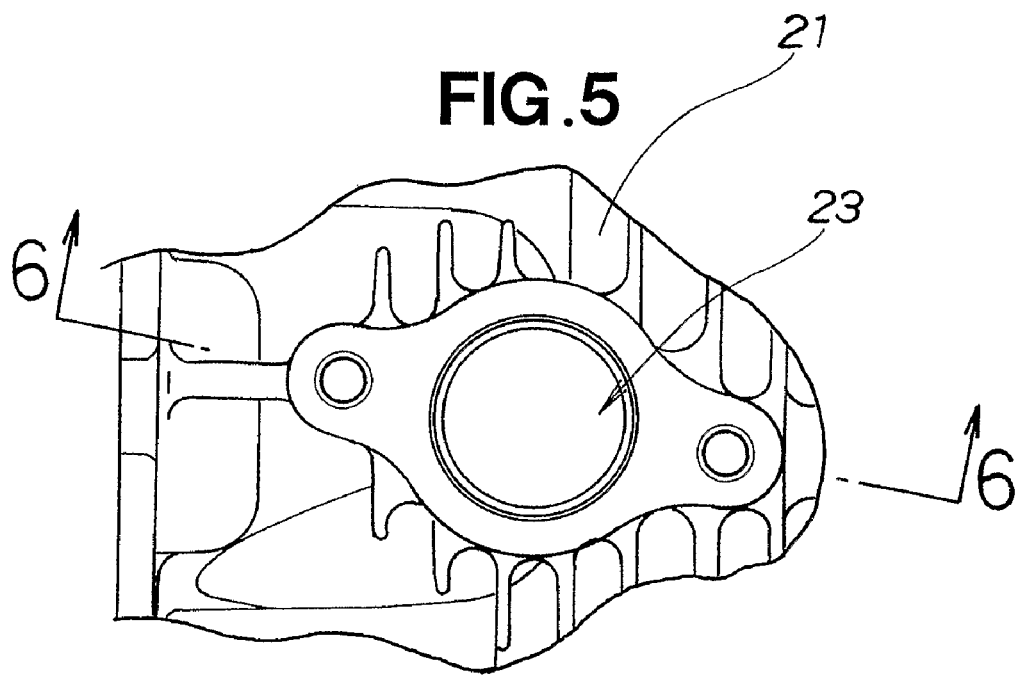
FIG. 5 is a plan view of an exhaust port of the engine body to which the muffler is connected.
Figure 6:
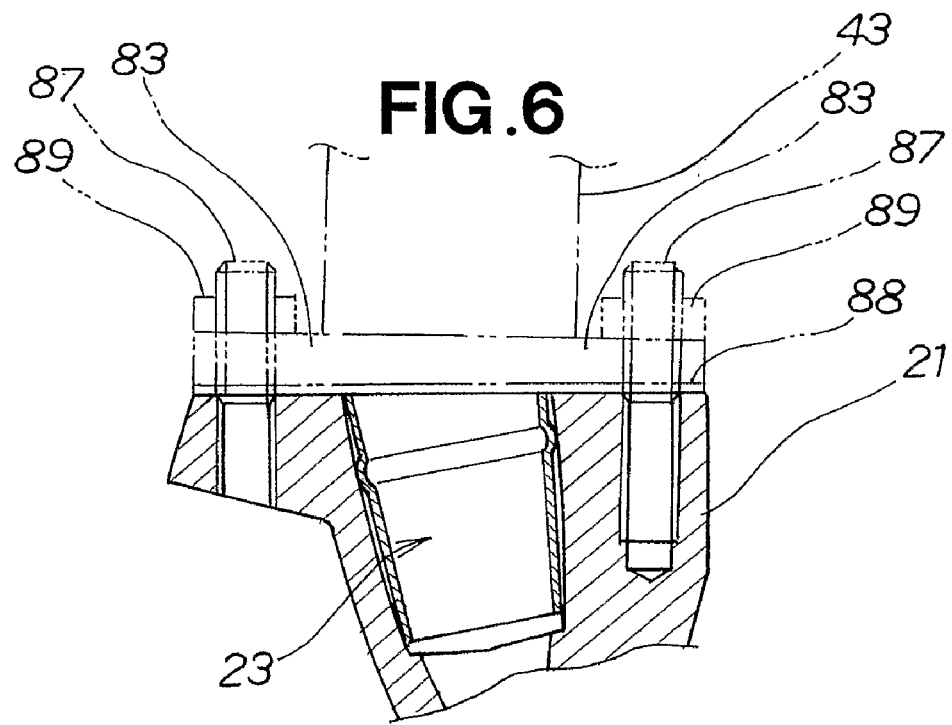
FIG. 6 is a cross-sectional view taken along line 6-6 of FIG. 5.

For connection to the exhaust port 23, a first end 43a of the exhaust pipe 43 is provided with a flange having a pair of diametrically opposed attachment portions (second and third attachment portions) 83, 83 (FIGS. 6 and 12) disposed symmetrically with each other with respect to a central axis of the exhaust pipe 43. The attachment portions 83 are secured to the cylinder head 21 by means of a pair of threaded fasteners each composed of a stud bolt 87 projecting from the cylinder head 21 and a nut 89 threaded with the stud bolt 87. A gasket 88 is disposed between the cylinder head 21 and the flange at the first end 83a of the exhaust pipe 43 to seal the exhaust port 23 (FIG. 5). Similarly, for connection to the muffler 40, a second end 43b of the exhaust pipe 43 is provided with a flange having a pair of diametrically opposite attachment portions 84, 84 (FIG. 12) disposed symmetrically with each other with respect to the central axis of the exhaust pipe 43. The attachment portions 84 are secured to the bottom wall of the muffler 40 by means of a pair of threaded fasteners each composed of a stud bolt 91 projecting from the bottom wall of the muffler 40 and a nut 92 threaded with the stud bolt 91.

By thus arranging the single support bracket 81 and the two attachment portions 83, 83, the muffler 40 is mounted at three points to the engine body 27. Obviously, such a three-point mount system is extremely stable and can effectively prevent generation of oscillation noise. According to the present invention, respective positions of the attachment portions 81, 83, 83 are determined so that a particular positional relationship is established between the attachment portions 81, 83, 83 and a center of gravity of the muffler 40. Furthermore, the exhaust pipe 43 has a bent portion 86 for a purpose described later. Yet, the bottom wall of the muffler 40 includes an inclined portion 111 (FIG. 7) sloping upward away from the engine body 27 for facilitating easy attachment and detachment of the muffler 40 to the engine body 27 via the exhaust pipe 43.

Figure 7:
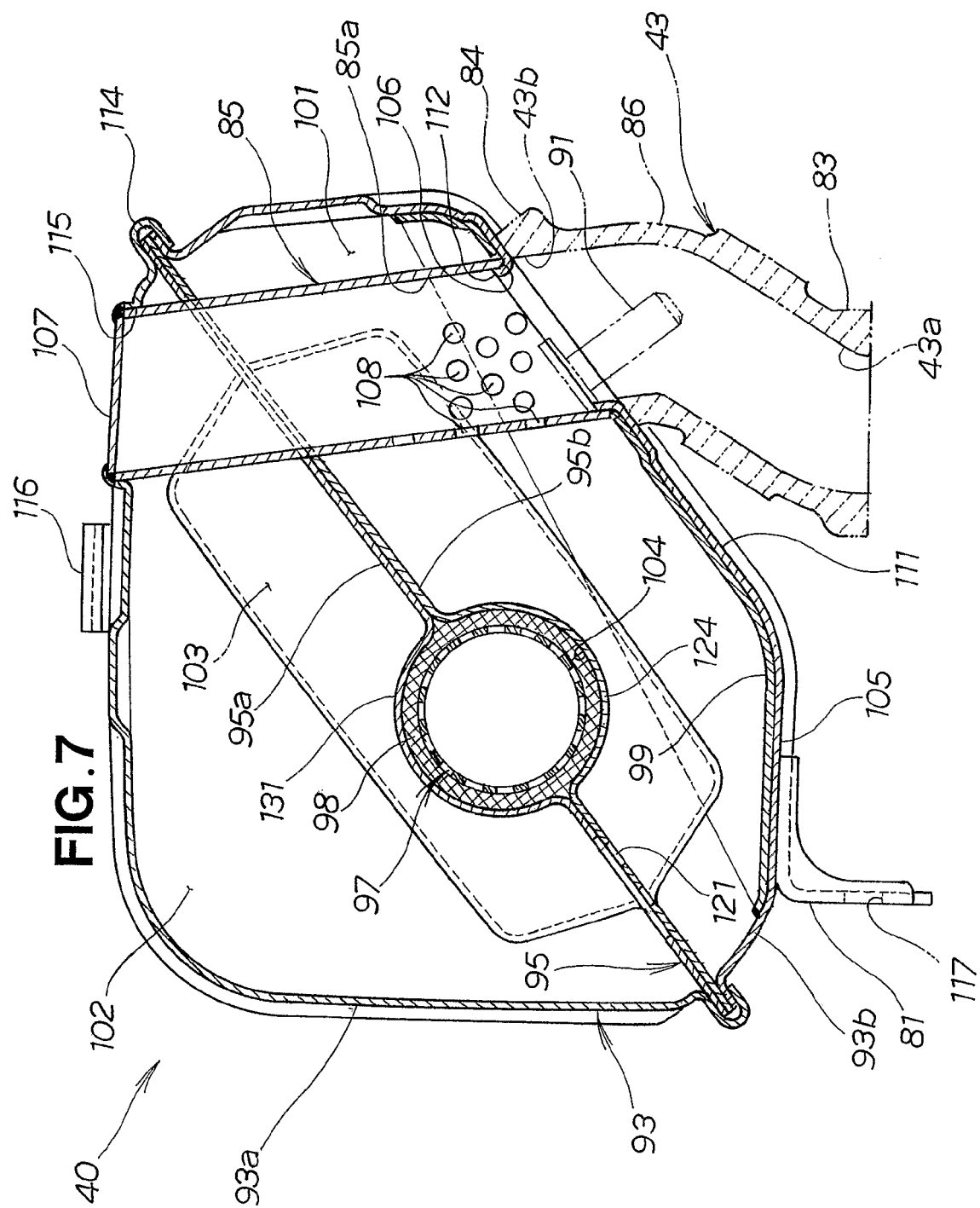
FIG. 7 is a side vertical cross-sectional view of a muffler of the muffler unit.

As shown in FIG. 7, the muffler 40 includes a housing 93 composed of an upper housing member 93a and a lower housing member 93b joined together by clenching with a partition wall 95 disposed therebetween. The thus formed housing 93 has two sound-deadening chambers 101 and 102 disposed on opposite sides of the partition wall 95. The partition wall 93 has a two-ply or double-layered structure including an upper partition wall member 95a and a lower partition wall member 95b lapped with one another. The muffler 40 also has an inlet pipe 85 disposed substantially vertically within the housing 93 and penetrating through the partition wall 95 (i.e., the upper and lower partition wall members 95a, 95b), and an outlet pipe 97 disposed horizontally and held between respective half-round recessed portions 131, 124 of the upper and lower partition wall members 95a, 95b, with a sound-absorbing material 98 of tubular shape disposed between the outlet pipe 97 and the half-round recessed portions 131, 124 of the upper and lower partition wall members 95a, 95b. The upper and lower partition wall members 95a, 95b are so configured as to define therebetween a third sound-deadening chamber 103. The bottom wall 105 of the housing 93, which is formed by a lower part of the lower housing member 93b, is reinforced by a reinforcing plate 99. The sound-absorbing material 98 preferably comprises glass wool.

Thus, the first sound-deadening chamber 101 is defined between the lower housing member 93b and the lower partition wall member 95b, the second sound-deadening chamber 102 is defined between the upper housing member 93a and the upper partition wall member 95a, and the third sound-deadening chamber 13 is defined between the upper partition wall member 95a and the lower partition wall member 95b. The tubular sound-absorbing material 98 is received in an annular space 104 defined between the outlet tube 97 and the half-round recessed portions 124, 131 of the upper and lower partition wall members 95a, 95b. The first, second and third sound-deadening chambers 102-103 communicate with one another, as will be discussed below, and form a maze of sound-deadening chambers.

The inlet pipe 85 has an open end 106 (lower end in FIG. 7) connected to the second end 43b of the exhaust pipe 43, and a closed end 107 (upper end in FIG. 7) penetrating through a top wall of the housing 93 and exposed to the outside air. In the illustrated embodiment, the closed end 107 of the inlet pipe 85 projects outward from the top wall of the housing 93 and is normally held in direct contact with the outside air. The inlet pipe 85 has a group of holes or perforations 108 formed therein at a portion located closer to the open end 106 than to the closed end 107 so exhaust gases can flow from the inlet pipe 85 through the perforations 108 into the first sound-deadening chamber 101. In the illustrated embodiment, the perforated portion of the inlet pipe 85 is located near the open end 106. As shown in FIG. 7, the perforations 108 are concentrated at one side (left side in FIG. 7) of the inlet pipe 85, and the other side 85a (right side in FIG. 7) of the inlet pipe 85 is free from perforation. The bent portion 86 of the exhaust pipe 43 is so configured as to guide the exhaust gasses to advance along the perforation-free side 85a of the inlet pipe 85 until they impinge upon the closed end 107 of the inlet pipe 85.

The open end 106 of the inlet pipe 85 is secured by clinching to a curled peripheral edge of an inlet hole 112 of the housing 93. The inlet hole 112 and the open end 106 of the inlet pipe 85 open at the inclined portion 111 of the bottom wall 105 of the housing 93. The stud bolts 91 (one being shown in FIG. 7) projects outwards from the inclined bottom wall portion 111 at right angles to the inclined bottom wall portion 111. The L-shaped support bracket 81 has a horizontal through-hole 117 for the passage therethrough of the screw 118 (FIG. 4). The closed end 107 of the inlet pipe 85 projects outwards from an opening 115 formed in the top wall of the housing 93 and is secured by welding to the top wall of the housing 93. The upper and lower housing members 93a, 93b have mating flanges clenched together to form a joint portion 114 of the housing 93, with the partition wall 95 held between the mating flanges of the upper and lower housing members 93a, 93b. The joint portion 114 extends parallel to the inclined bottom wall portion 111 of the housing 93. A clamp member 116 is provided on the top wall of the housing 93 for retaining the muffler cover 41 (FIG. 4) on the housing 93 of the muffler 40.

Figure 8:
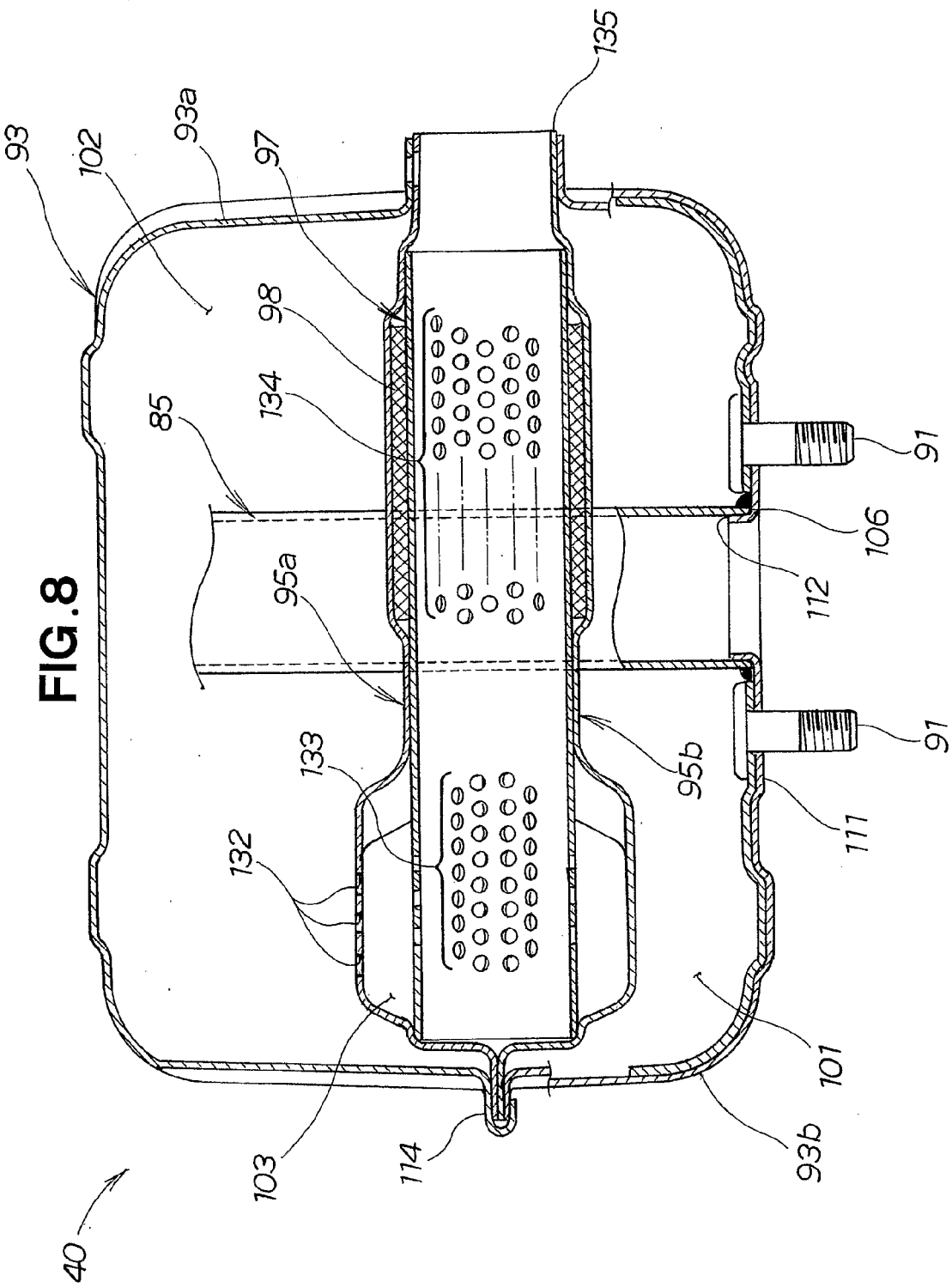
FIG. 8 is a front elevational vertical cross-sectional view of the muffler.

As shown in FIG. 8, the outlet pipe 97 has one end (left end in this figure) closed by being abutted on a side wall of the third sound-deadening chamber 103, and the opposite end 135 (right end in FIG. 8) opening to the outside air and forming a discharge opening of the muffler 40. The outlet pipe 97 has a first group of holes or perforations 133 formed therein at a portion located closer to the closed one end than to the open end (discharged opening) 135 for introducing the exhaust gases from the third sound-deadening chamber 103 into the outlet pipe 97, and a second group of holes or perforations 134 formed therein at a portion located closer to the open end (discharge opening) 135 than the open end of the outlet pipe 97 for allowing the exhaust gasses to diffuse into the sound-absorbing material 98, thereby absorbing sound energy of the exhaust gasses. The open end 106 of the inlet pipe 85 is also joined by welding to the inclined bottom wall portion 111 of the housing 93. The upper partition wall member 95a has a group of holes or perforations 132 for introducing the exhaust gasses from the second sound-absorbing chamber 102 into the third sound-absorbing chamber 103.

Figure 9:
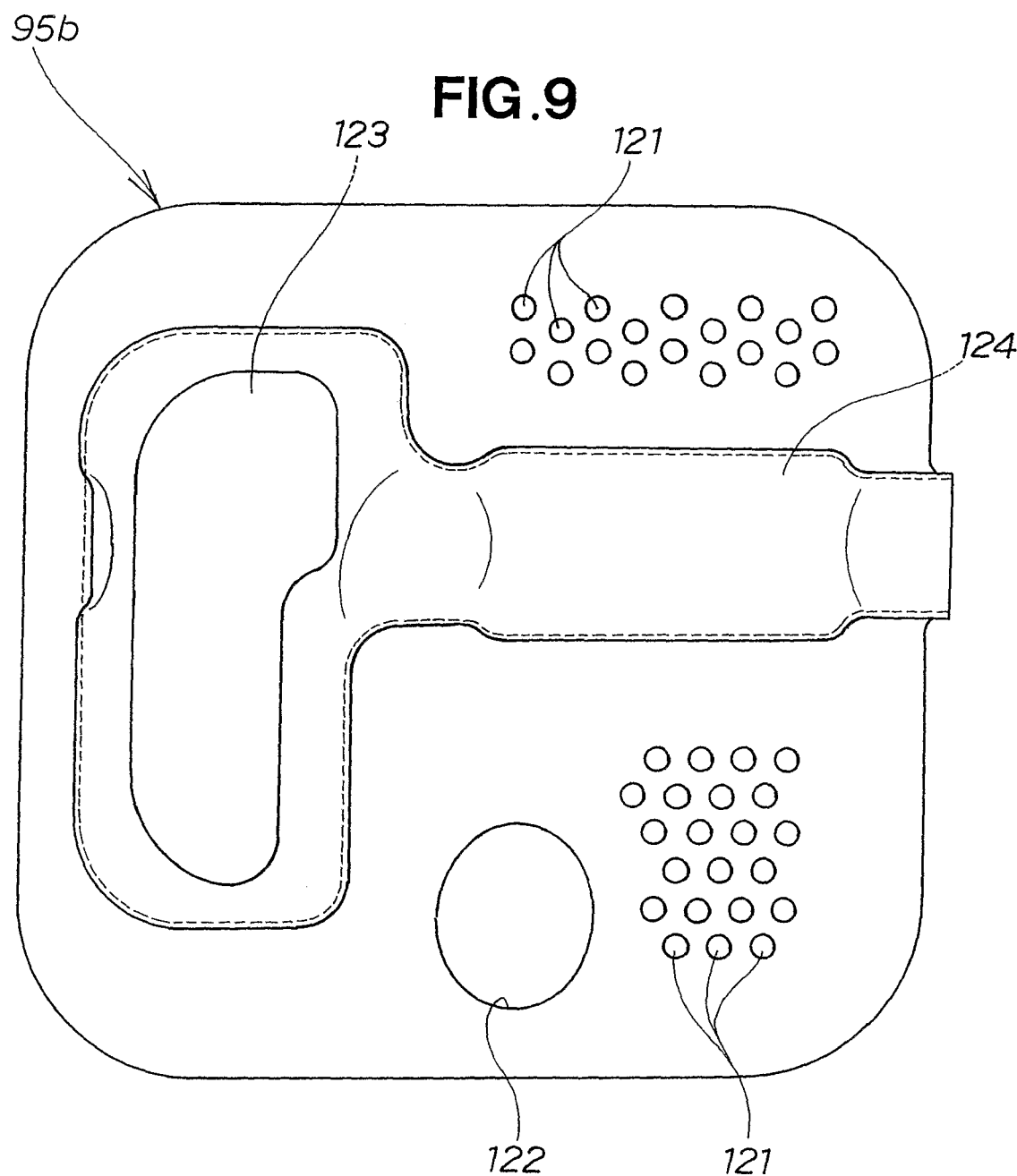
FIG. 9 is a bottom view of a lower partition wall member of the muffler.

FIG. 9 shows a bottom view of the lower partition wall member 95b. As shown in this figure, the lower partition wall member 95b is press-formed from a sheet metal and includes a group of holes or perforations 121 for introducing the exhaust gasses from the first sound-deadening chamber 101 (FIG. 7) into the second sound-deadening chamber 102 (FIG. 7), a round hole 122 through which the inlet pipe 85 penetrates, a first bulged portion forming a recessed portion 123 on the opposite side (upper side) of the lower partition wall member 95b, and a second bulged portion forming the aforesaid half-round recessed portion 124 on the opposite side (upper side) of the lower partition wall member 95b. The recessed portion 123 defines a lower part of the third sound-deadening chamber 103 (FIG. 8). The half-round recessed portion 124 defines a lower part of the annular space 104 (FIG. 7) in which the outlet pipe 97 surrounded by the sound-absorbing material 98 (FIGS. 7 and 8) is received. The perforations 121 are formed on opposite sides of the half-round recessed portion 124.

Figure 10:
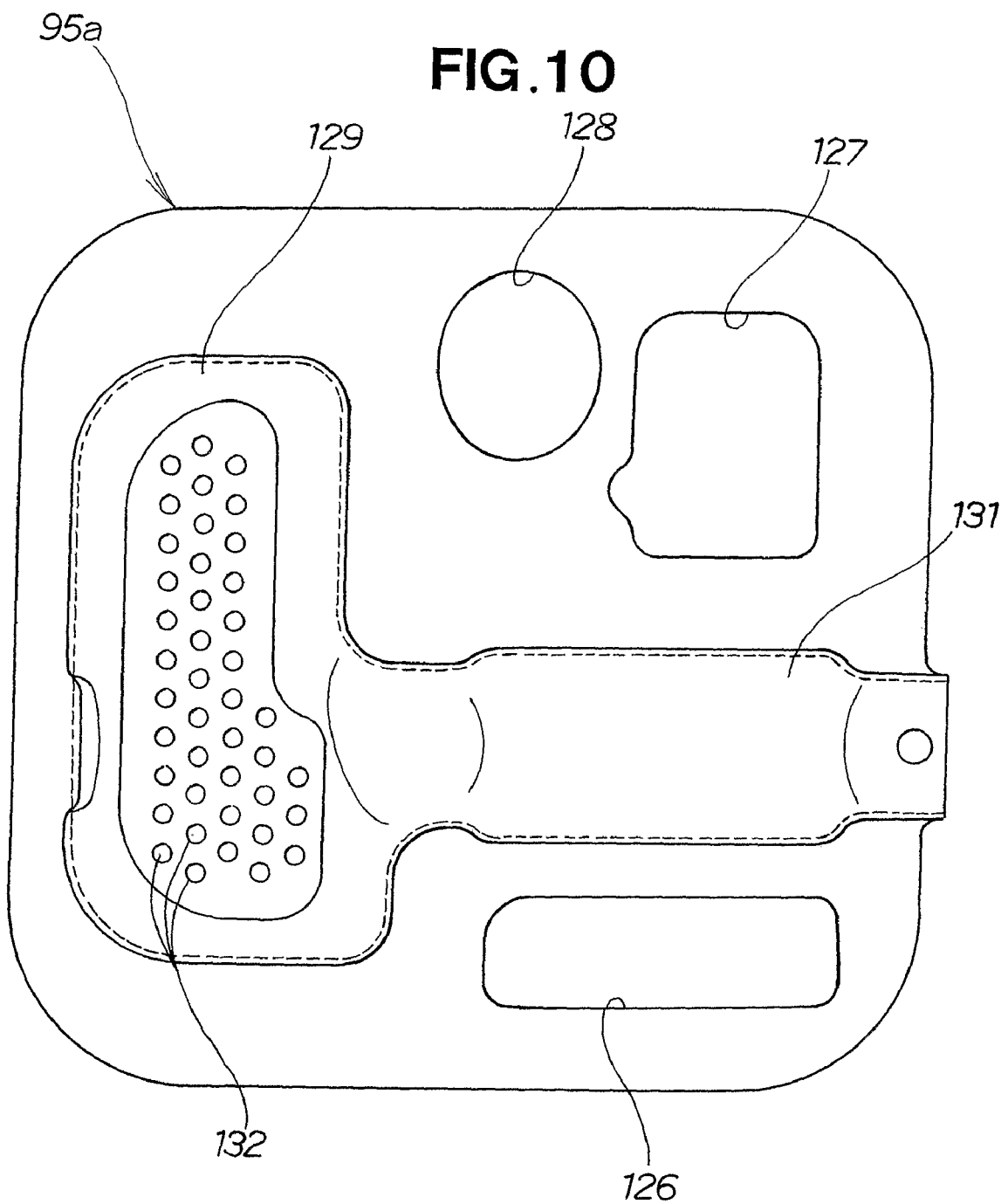
FIG. 10 is a top plan view of an upper partition wall member of the muffler.

FIG. 10 shows a top plan view of the upper partition wall member 95a. As shown in this figure, the upper partition wall member 95a is press-formed from a sheet metal and includes a first elongated rectangular opening 126 formed therein at a position corresponding to the position of a first group of perforations 121 which is located on one side (upper side in FIG. 9) of the half-round recessed portion 124 of the lower partition wall member 85b, a second rectangular opening 127 formed therein at a position corresponding to the position of a second group of perforations 121 which is located on the other side (lower side in FIG. 9) of the half-round recessed portion 124, a round hole 128 through which the inlet pipe 85 penetrates, a first bulged portion forming a recessed portion 129 on the opposite side (lower side) of the upper partition wall member 95a, and a second bulged portion forming the aforesaid half-round recessed portion 131 on the opposite side (lower side) of the upper partition wall member 95a. The recessed portion 129 defines an upper part of the third sound-deadening chamber 103 (FIG. 8) and has the perforations 132 formed therein. The half-round recessed portion 131 defines an upper part of the annular space 104 (FIG. 7) in which the outlet pipe 97 surrounded by the sound-absorbing material 98 (FIGS. 7 and 8) is received. With the rectangular openings 126, 127 thus formed, the perforations 121 are not closed by the upper partition wall member 95a and connect the first sound-deadening chamber 101 and the second sound-deadening chamber 102 in fluid communication with each other.

The muffler unit of the foregoing construction operates as follows. Exhaust gasses discharged from the engine body 27 (FIG. 4) are introduced through the exhaust pipe 43 into the inlet pipe 85 (FIG. 7) disposed inside the muffler 40. In this instance, since the exhaust gasses have certain flow velocities, most part of the exhaust gasses advances from the open end 106 toward the closed end 107 of the inlet pipe 85 while bypassing the perforations 108. Furthermore, by virtue of the bent portion 86 (FIG. 7) of the exhaust pipe 43, the exhaust gasses are guided to flow along the non-perforated side 85a (FIG. 7) of the inlet pipe 85 until they impinge upon the closed end 107 of the inlet pipe 85, as indicated by the arrow "a1" shown in FIG. 11.

Upon impingement on the closed end 107 of the inlet pipe 85, the speed and pressure of the exhaust gasses drop and the sound level is reduced. Furthermore, since the closed end 107 of the inlet pipe 85 is always exposed to the outside air and hence has a temperature very much lower than that of the exhaust gasses, the exhaust gasses are cooled as the gasses impinge on the closed end 107 of the inlet pipe 85. By thus cooling the exhaust gasses, thermal energy of the exhaust gasses is considerably reduced. This is particularly effective to lower the exhaust sound level of the general-purpose engine. Furthermore, since the closed end 107 of the inlet pipe 85 projecting from the top wall of the muffler housing 93 has a relatively large surface area, cooling of the exhaust gasses is achieved with increased efficiencies.

At the closed end 107 of the inlet pipe 85, the exhaust gases make a U turn, as indicated by the arrow "a2" shown in FIG. 11 and subsequently flow from the perforations 108 in the inlet pipe 85 into the first sound-deadening chamber 101, as indicated by the arrow "a3" shown in FIG. 11. By thus making a U turn, a stream of exhaust gasses which has been cooled by the closed end 107 of the inlet pipe 85 comes in direct contact with a stream of un-cooled exhaust gasses directed toward the closed end 107 of the inlet pipe 85. The direct contact of the two streams of exhaust gasses offers additional reduction of thermal energy of the exhaust gasses, leading to further reduction of the exhaust sound.

Within the first sound-deadening chamber 101, the exhaust gasses flow in a branched fashion, as indicated by the arrows "a4" and "a5" and then pass through the perforations 121 formed in the partition wall 95 (FIG. 7). The exhaust gasses are thus introduced into the second sound-deadening chamber 102, as indicated by the arrows "a6" and "a7" shown in FIG. 11. During that time, the speed and pressure of the exhaust gasses further drop and the sound level is reduced correspondingly.

Thereafter, the exhaust gasses in the second sound-deadening chamber 102 flow from the perforations 132 into the third sound-deadening chamber 103, as indicated by the arrows "a8" and "a9" shown in FIG. 11. Subsequently, the exhaust gasses in the third sound-deadening chamber 103 are introduced from the perforations 133 (FIG. 8) into the outlet pipe 97, as indicated by the arrow "a10" shown in FIG. 11. The exhaust gasses then advance along the outlet pipe 97 toward the discharge opening 135 thereof, as indicated by the arrow "a11" shown in FIG. 11. At the perforations 134 (FIG. 8), the exhaust gasses are allowed to diffuse into the sound-absorbing material 98 (FIG. 8), as indicated by the arrow "a12" shown in FIG. 11, and the sound level of the exhaust gasses is further reduced. The exhaust gasses, which have been sufficiently reduced in temperature and sound level are discharged from the discharge opening 135 (FIG. 8) of the outlet pipe 97, as indicated by the arrow "a13" shown in FIG. 11. The discharge opening 135 of the outlet pipe 97 is connected to the tail pipe 45 (FIG. 1) secured to the muffler cover 41.

It will be appreciated that when exhaust gasses are routed to pass through a maze of chambers (including the inlet pipe 85, the first, second and third chambers 101, 102 and 103, the outlet pipe 97, and the sound-absorbing material 98) via the groups of perforations 108, 121, 132, 133 and 134, the speed and pressure of the exhaust gasses drop and the sound level is reduced. Furthermore, the closed end 107 of the inlet pipe 85. In this instance, since the closed end 107 of the inlet pipe 85 is exposed to the outside air and hence has a temperature much lower than a temperature of exhaust gasses introduced in the inlet pipe 85, thermal energy of the exhaust gasses are reduced upon impingement of the exhaust gasses on the cooled closed end 107 of the inlet pipe 85. This cooling is effective to lower the exhaust sound of the general-purpose engine 10. Additionally, since the inlet pipe 85 and the outlet pipe 97 of the muffler 40 are disposed perpendicularly to each other, it is possible to provide a long exhaust gas passage without increasing the overall size of the muffler 40.

As previously discussed with reference to FIGS. 4 and 12, the muffler 40 is mounted to the engine body 27 via a three-point mount system, which is formed jointly by the first attachment portion (support bracket) 81 provided for attachment to the retaining lug 82 on the cylinder head 21 of the engine body 27, the second attachment portion 83 and the third attachment portion 83 that are provided at one end of the exhaust pipe 43 in symmetric relation to each other with respect to the central axis of the exhaust pipe 43 for attachment with the inlet port 23 of the engine body 27. As shown in FIG. 12, in a plan view, the first, second and third attachment portions 81, 83, 83 of the muffler unit (formed by the muffler 40 and the exhaust pipe 43) are located at respective corners of a triangle T1 indicated by dash-and-dot lines shown in FIG. 12, and a center of gravity G1 of the muffler 40 is located inside the triangle T. By thus arranging the center of gravity G1 of the muffler 40 relative to the triangle T1 formed by the respective attachment portions 81, 83, 83 of the three-point mount system, it is possible to keep the muffler 40 stable in position and uneasy to undergo oscillation without requiring strengthening of the attachment portions which would increase the weight, size and cost of the general-purpose engine.

As shown in FIG. 12, in a plan view, the attachment portions 84, 84 provided at the other end of the exhaust pipe 43 in symmetric relation to each other with respect to the central axis of the exhaust pipe 43 for attachment to the muffler 40 are disposed outside the triangle T1 that is formed by the first, second and third attachment portions 81, 83, 83 at the one end of the exhaust pipe 43. By thus arranging the attachment portions 84, 84 in an offset position relative to the second and third attachment portions 83, 83, the exhaust pipe 43 is able to offer an enhanced vibration-suppressing effect to the muffler 40. In a precise sense, the first attachment portion 81 corresponds in position to a joint between the support bracket 81 and the retaining lug 82 that are connected together by the screw 118, and the second and third attachment portions 83, 83 correspond in position to axes of the stud bolts 87, 87.

Figure 13A:
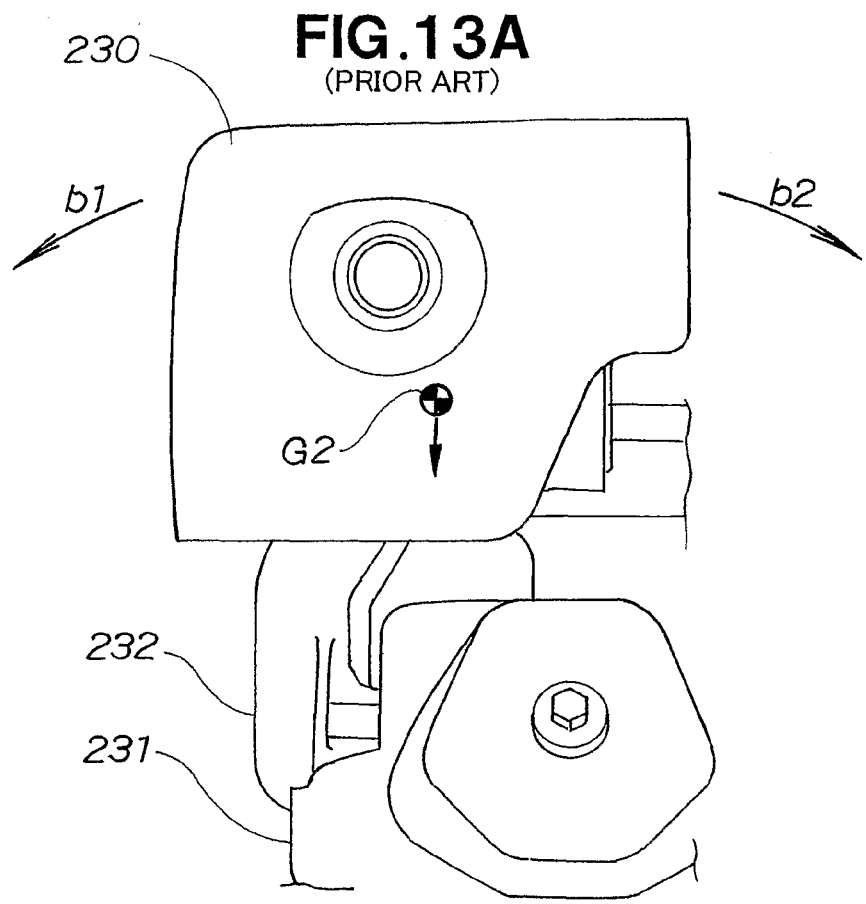
FIG. 13A is a side view showing a muffler mounting structure of a conventional muffler unit.

FIG. 13A shows, for comparative purposes, a conventional muffler 230 connected to a distal end of an exhaust pipe 232 extending in a cantilevered fashion from a cylinder head 231 of the engine. The muffler 230 thus supported on the cantilevered exhaust pipe 232 is likely to undergo oscillation about the proximal end of the exhaust pipe 232, as indicated by the arrows "b1" and "b2", resulting in generation of oscillation noise. Reference character G2 in FIG. 13A denotes a center of gravity of the muffler 230.

Figure 13B:
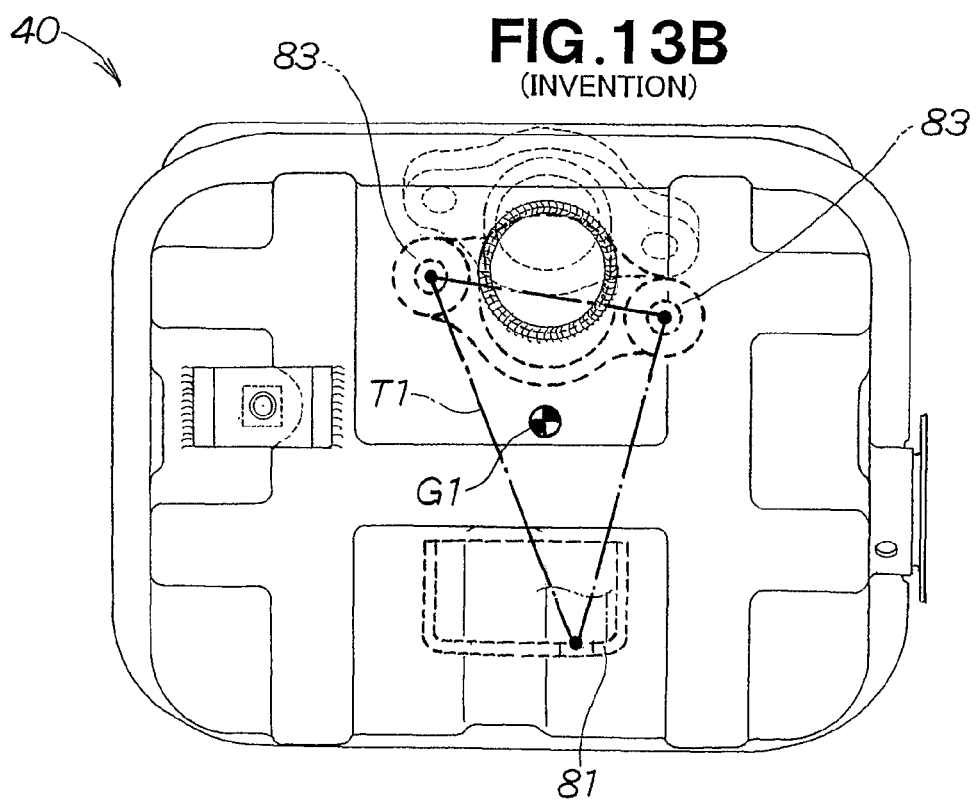
FIG. 13B is a plan view similar to FIG. 12, showing a muffler mounting structure according to the invention.

FIG. 13B is a plan view showing the positional relationship established according to the invention between the center of gravity G1 of the muffler 40 and the triangle T1 formed jointly by the first, second and third attachment portions 81, 83, 83 of the muffler unit (including the muffler 40 and the exhaust pipe 43). This positional relationship is previously discussed with reference to FIGS. 4 and 12 and no further description is needed.

FIG. 14 shows a modified arrangement of the attachment portions 81, 83, 83 of the muffler unit including the muffler 40 and the exhaust pipe 43. The modified arrangement is substantially the same as that shown in FIG. 12 with the triangle T2 formed by interconnecting the first, second and third attachment portions 81, 83, 83 is an isosceles triangle T2 and the first attachment portion 81 is located at an apex angle of the isosceles triangle T2. In the modified arrangement, the center of gravity G1 of the muffler 40 is also located inside the isosceles triangle T2. The arrangement shown in FIG. 14 is advantageous over the arrangement shown in FIG. 12 in that the weight of the muffler 40 is almost evenly exerted on the three attachment portions 81, 83, 83.

Figure 15A:
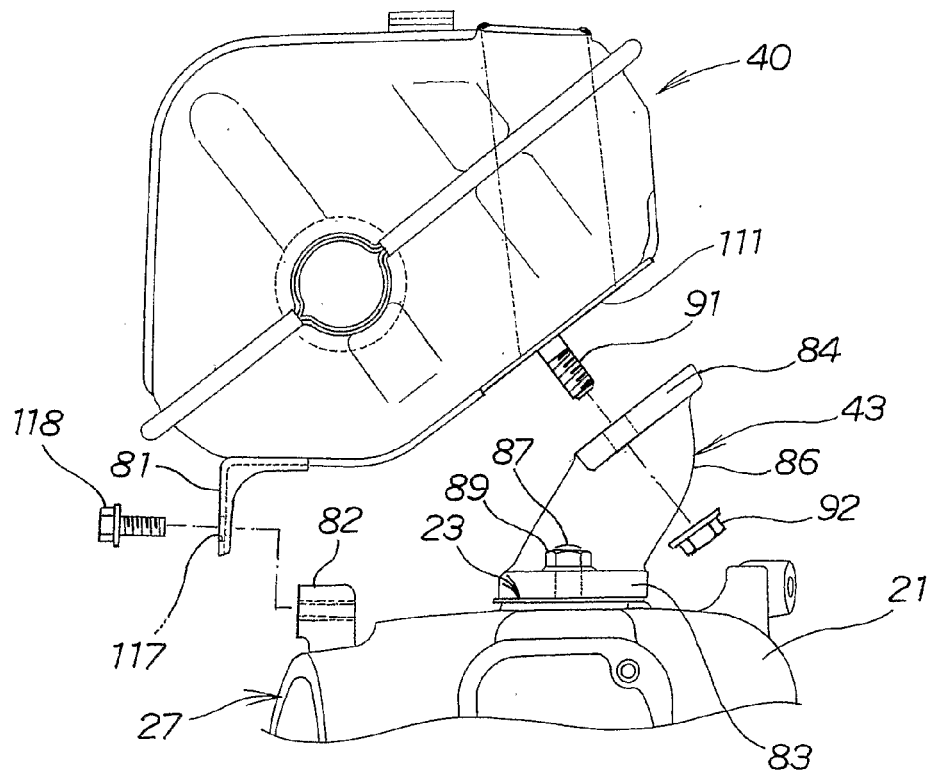
FIGS. 15A and 15B are views illustrative of the manner in which the muffler unit including the muffler and an exhaust pipe is mounted to the engine body.
Figure 15B:
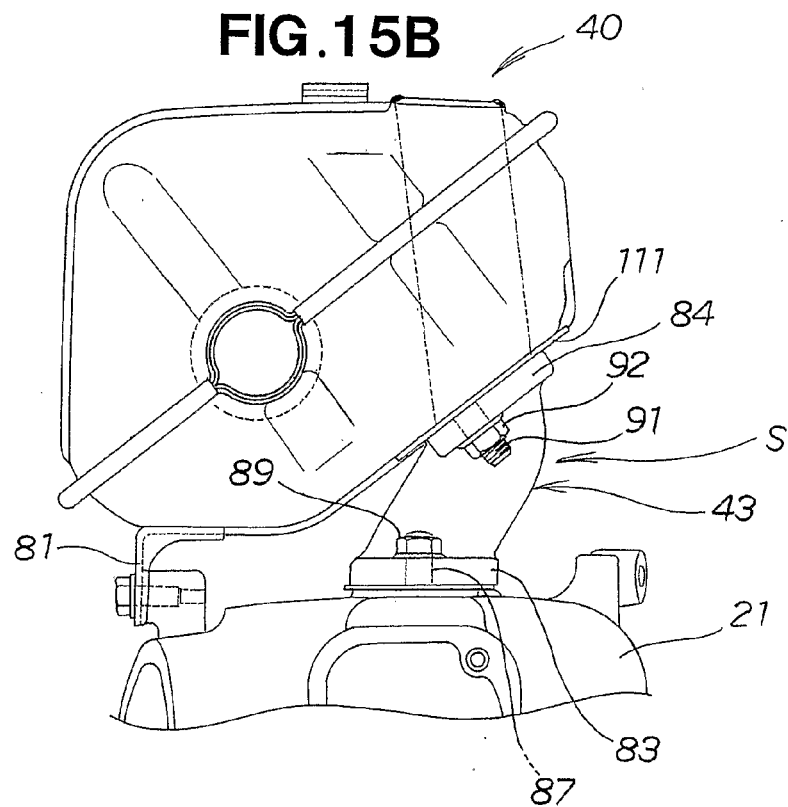
Figure 17:
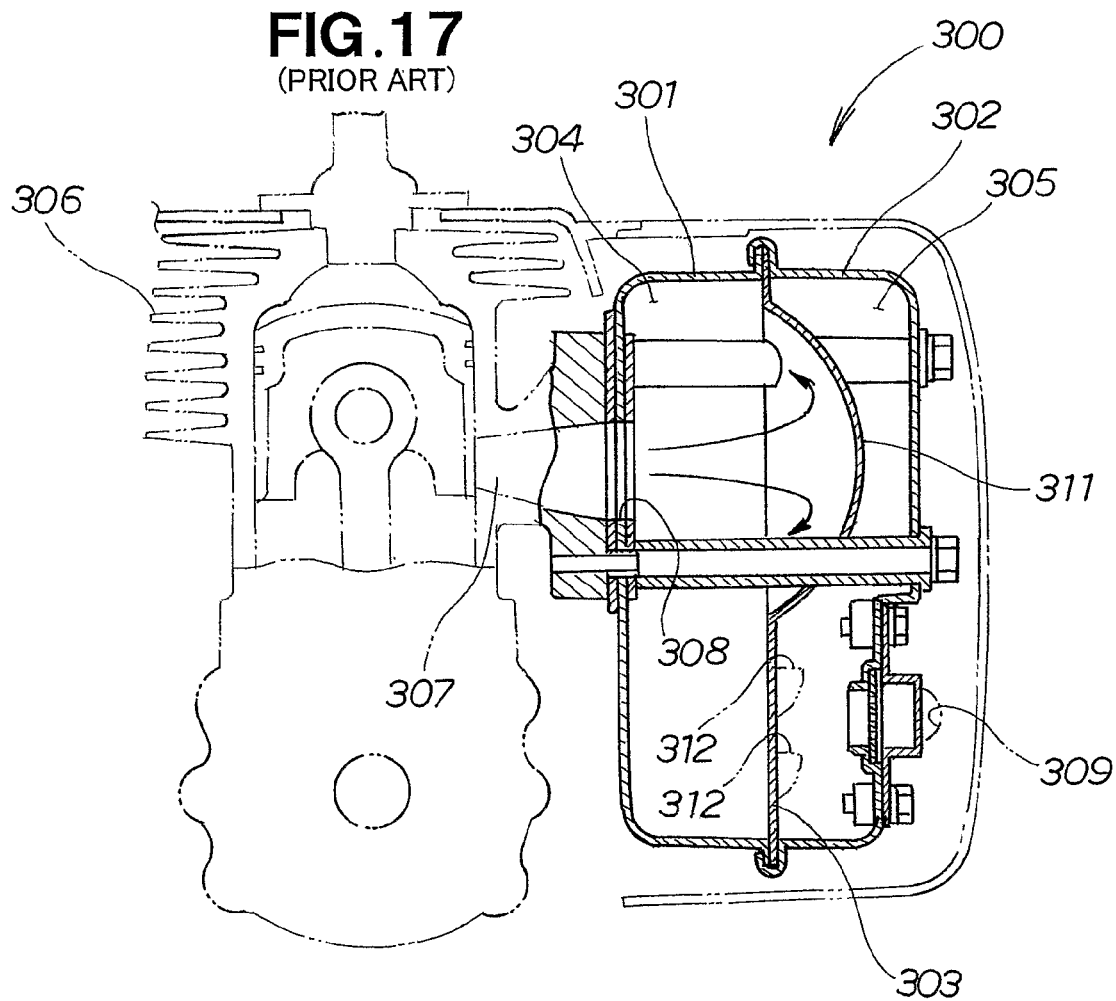
FIGS. 17, 18 and 19 are views showing typical examples of conventional muffler units employed in general-purpose engines.
Figure 18:
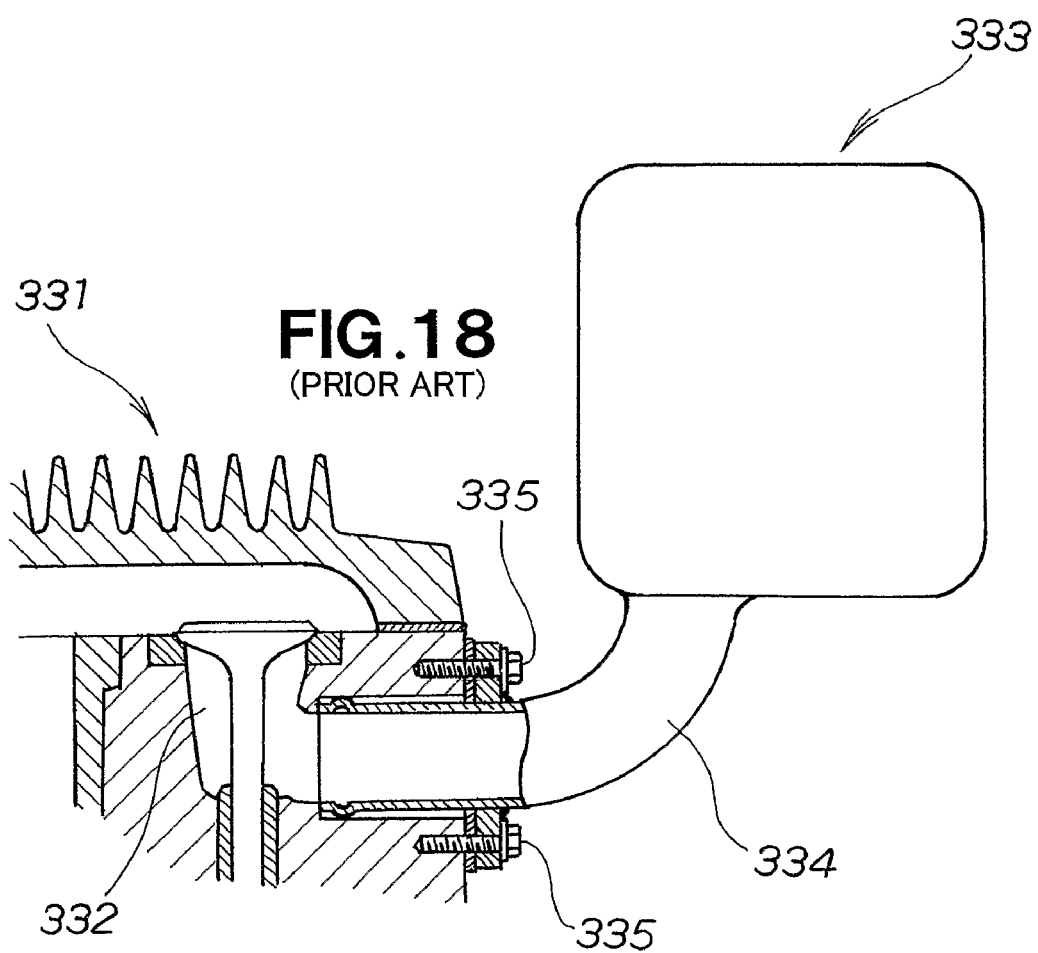
Figure 19:
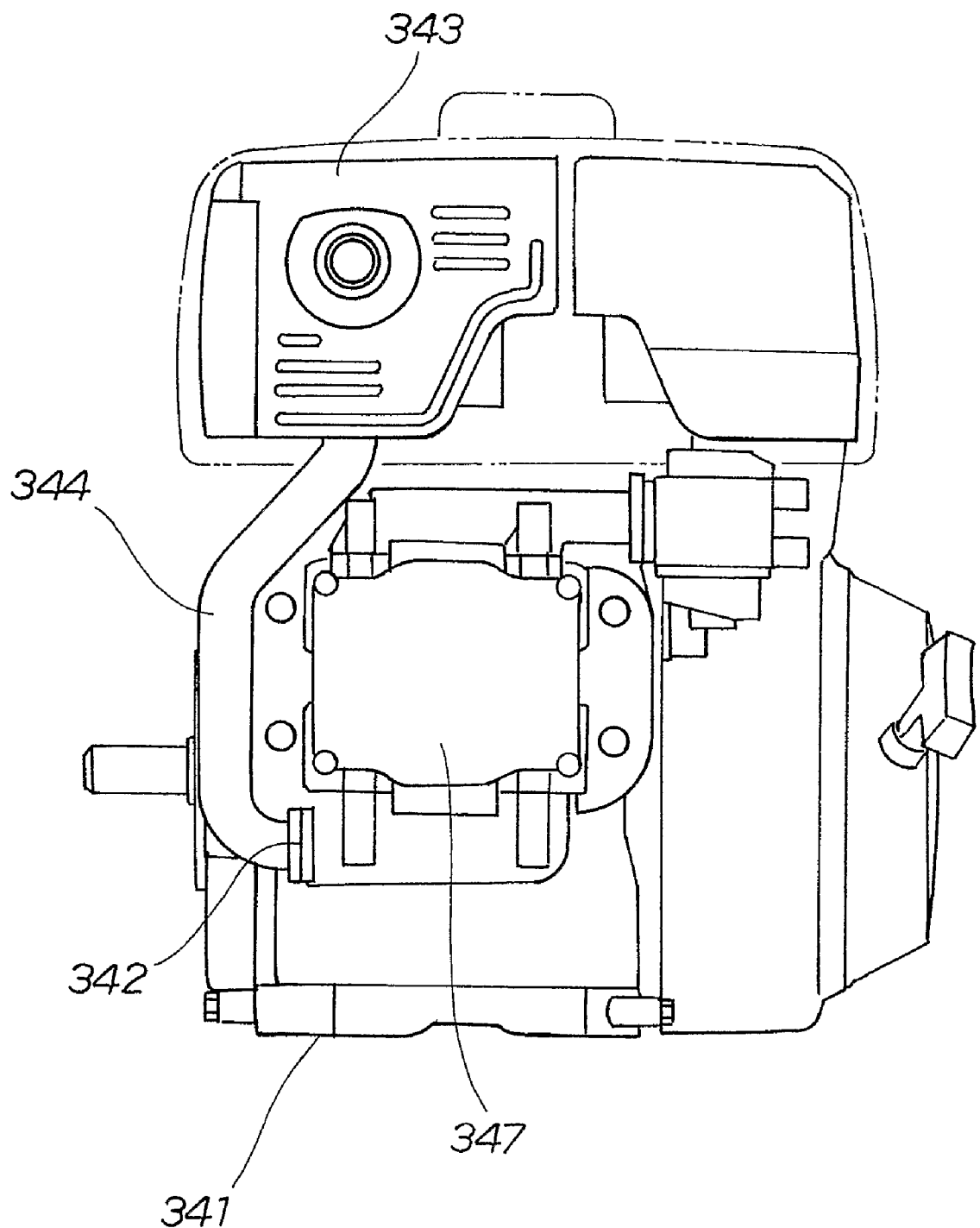

FIGS. 15A and 15B illustrate the manner in which the muffler 40 is mounted on the engine body 27 via the exhaust pipe 43.

As shown in FIG. 15A, a pair of diametrically opposite attachment portions 83 (only one being shown) at one end (lower end) of the exhaust pipe 43 are attached to the cylinder head 21 of the engine body 27 in fluid communication with the exhaust port 23 by means of a pair of threaded fasteners (only one being shown) each composed of a stud bolt 87 projecting from the cylinder head 21 in a vertical upward direction and a nut 89 threaded with the stud bolt 87. Then the muffler 40 is attached to a pair of diametrically opposite attachment portions 84 (only one shown) at the other end (upper end) of the exhaust pipe 43 by means of another pair of threaded fasteners (only one shown) composed of a stud bolt 91 projecting perpendicularly from the inclined bottom wall portion 111 of the muffler 40 and a nut 92 threaded with the stud bolt 91. The muffler 40 is also attached to the cylinder head 21 by means of a screw 118 tightly securing the support bracket 81 of the muffler 40 to the retaining lug 82 on the cylinder head 21. The muffler 40 is thus mounted on the cylinder head 21 of the engine body 27 via the exhaust pipe 43, as shown in FIG. 15B.

In this instance, since the muffler 40 has the inclined bottom wall portion 111 sloping upward away from the cylinder head 21, there is provided, between the inclined bottom surface 11 and the cylinder head 21, a relatively large wedge-like or triangular space S (FIG. 15B) that can be used for accommodating a tool when the nuts 89, 92 are to be tightened onto the mating stud bolts 87, 91. Furthermore, by virtue of the inclined bottom wall portion 111, each of the stud bolts 91 projecting from the inclined bottom wall portion 111 and a corresponding one of the stud bolts 87 projecting from the cylinder head 21 are not vertically aligned with each other but they extend at an angle to each other. Such angled arrangement of the first and second stud bolts 87, 91 ensures that the tool used for tightening the nuts 92 can be placed or set in an operating position without interference with the nuts 89 already tightened on the stud bolts 87. As shown in FIG. 15B, the attachment portions 84 of the exhaust pipe 43 are offset from the attachment portions 83, 83 of the exhaust pipe 43 toward the large end (right end in FIG. 15B) of the triangular space S. This arrangement allows a human operator to perform interference-free temporary tightening of the nuts 89, 92, Thus, the muffler 40 can be mounted on the engine body 27 with increased efficiencies.

FIG. 16 is a view explanatory of a cooling effect that can be achieved by the wedge-line or triangular space S provided between the inclined bottom wall portion 111 and the cylinder head 21 of the engine body 27. Since a large end (right end in FIG. 16) of the triangular space S provides a larger opening than a small end (left end in FIG. 16) and hence accepts a larger amount of air than the small end, the outside air tends to creates a stream of air flowing from the large end into the triangular space S and leaving the space S from the small end, as indicated by the arrows "c1" shown in FIG. 16. The outside air, as it passes through the triangular space S, performs cooling of not only the exhaust pipe 43 disposed within the triangular space S but also the cylinder head 21 and the bottom wall 105 of the muffler 40. By thus cooling the exhaust pipe 43, thermal energy of the exhaust gasses while passing through the exhaust pipe 43 is considerably reduced. Furthermore, cooling of the bottom wall 105 by a stream of outside air is effective to further reduce thermal energy of the exhaust gasses as the gasses pass through the first sound-deadening chamber 101 (FIG. 7) defined partially by the thus cooled bottom wall 105.

In the illustrated embodiment, the muffler 40 and the exhaust pipe 43 are formed separately as structurally independent parts. It is possible according to the invention to form the muffler 40 and the exhaust pipe 43 in one piece with each other.

INDUSTRIAL APPLICABILITY

With the arrangements so far described, the present invention can be used advantageously as an exhaust system for a general-purpose engine including a muffler connected to an outlet port of the engine via an exhaust pipe formed either integrally with or separately from the muffler.

The invention claimed is:

1. A muffler unit for a general-purpose engine including an engine body having an exhaust port, the muffler unit comprising:
    an exhaust pipe having a first end adapted to be connected to the exhaust port of the engine body and a second end opposite to the first end; and
    a muffler having a maze of sound-deadening chambers defined therein and an inlet pipe disposed inside the muffler, the inlet pipe having an open end connected to the second end of the exhaust pipe and a closed end opposite to the open end, the closed end of the inlet pipe being exposed to the outside air, the inlet pipe further having a group of perforations formed therein to connect an internal space of the inlet pipe in fluid communication with a first sound-deadening chamber of the maze of sound-deadening chambers, the perforations being located closer to the open end than to the closed end of the inlet pipe
    wherein the muffler has a single first attachment portion adapted to be attached to the engine body, wherein the first end of the exhaust pipe has a second attachment portion and a third attachment portion that are disposed symmetrically with respect to a central axis of the exhaust pipe for attachment to the exhaust port of the engine body, and wherein in a plan view, the first, second and third attachment portions are located at respective corners of a triangle, and the muffler has a center of gravity disposed inside the triangle.

2. The muffler unit as defined in claim 1, wherein the closed end of the inlet pipe projects outwardly from an outside surface of the muffler.

3. The muffler unit as defined in claim 1, wherein the exhaust pipe has a bent portion so configured as to guide exhaust gasses to advance-along one side of the inlet pipe until the gasses impinge on the closed end of the inlet pipe.

4. The muffler unit as defined in claim 3, wherein the one side of the inlet pipe is free from perforations.

5. The muffler unit as defined in claim 1, wherein the muffler further includes an outlet pipe disposed therein for discharging exhaust gasses from a last sound-deadening chamber of the maze of sound-deadening chambers to the outside of the muffler, and wherein the inlet pipe and the outlet pipe are disposed perpendicularly to each other.

6. The muffler unit as defined in claim 1, wherein the second end of the exhaust pipe has a pair of attachment portions disposed symmetrically with respect to the central axis of the exhaust pipe, and wherein in a plan view, the attachment portions of the second end are disposed outside the triangle and offset from the second and third attachment portions of the first end in a direction away from the first attachment portion of the muffler.

7. The muffler unit as defined in claim 1, wherein the triangle is an isosceles triangle, and the first attachment portion of the muffler is located at an apex angle of the isosceles triangle.

8. The muffler unit as defined in claim 1, wherein the muffler has a support bracket formed integrally therewith and forming the first attachment portion.

9. The muffler unit as defined in claim 1, wherein the muffler has an inclined bottom wall portion sloping upward so as to define, between the inclined bottom wall portion and a portion of the engine body including the exhaust port, a space of generally triangular configuration, and wherein the exhaust pipe is disposed within the triangular space.

10. The muffler unit as defined in claim 9, wherein the inclined bottom wall portion partially defines the first sound-deadening chamber.

11. The muffler unit as defined in claim 9, wherein the muffler has a partition wall disposed therein to separate an internal space of the muffler into the first sound-deadening chamber and a second sound-deadening chamber, the partition wall extending substantially parallel to the inclined bottom wall portion of the muffler.

12. The muffler unit as defined in claim 9, wherein the engine body has a plurality of first stud bolts disposed around the exhaust port in symmetric relation to one another about a center axis of the exhaust port and projecting upwardly from the engine body for connection of the first end of the exhaust pipe relative to the exhaust port, wherein the muffler has a plurality of second stud bolts disposed around the open end of the inlet pipe in symmetric relation to one another about a central axis of the inlet pipe and projecting perpendicularly from the inclined bottom wall portion of the muffler for connection of the second end of the exhaust pipe relative to the muffler, and wherein each of the first stud bolts and a corresponding one of the second stud bolts are out of vertical alignment with each other and extend at an angle to each other.

13. The muffler unit as defined in claim 12, wherein the triangular space has a large end and a small end opposite to the large end, and wherein each of the second stud bolts is offset from a corresponding one of the first stud bolts in a direction toward the large end of the triangular space.

14. A muffler unit for a general-purpose engine including an engine body having an exhaust port, the muffler unit comprising:
    an exhaust pipe having a first end adapted to be connected to the exhaust port of the engine body and a second end opposite to the first end; and
    a muffler connected to the second end of the exhaust pipe and having a single first attachment portion adapted to be connected to the engine body,
    wherein the first end of the exhaust pipe has a second attachment portion and a third attachment portion that are disposed symmetrically with respect to a central axis of the exhaust pipe for attachment to a portion of the engine body including the exhaust port, and
    wherein in a plan view, the first, second and third attachment portions are located at respective corners of a triangle, and the muffler has a center of gravity disposed inside the triangle.

15. The muffler unit as defined in claim 14, wherein the second end of the exhaust pipe has a pair of attachment portions disposed symmetrically with respect to the central axis of the exhaust pipe, and wherein in a plan view, the attachment portions of the second end are disposed outside the triangle and offset from the second and third attachment portions of the first end in a direction away from the first attachment portion of the muffler.

16. The muffler unit as defined in claim 14, wherein the triangle is an isosceles triangle, and the first attachment portion of the muffler is located at an apex angle of the isosceles triangle.

17. The muffler unit as defined in claim 14, wherein the muffler has a support bracket formed integrally therewith and forming the first attachment portion.

18. The muffler unit as defined in claim 14, wherein the muffler has an inclined bottom wall portion sloping upward so as to define, between the inclined bottom wall portion and the portion of the engine body including the exhaust port, a space of generally triangular configuration, and wherein the exhaust pipe is disposed within the triangular space.

19. The muffler unit as defined in claim 18, wherein the muffler has a maze of sound-deadening chambers defined therein, and the inclined bottom wall portion partially defines a first sound-deadening chamber of the maze of sound-deadening chambers.

20. The muffler unit as defined in claim 18, wherein the muffler has a partition wall disposed therein to separate an internal space of the muffler into two sound-deadening chambers, the partition wall extending substantially parallel to the inclined bottom wall portion of the muffler.

21. The muffler unit as defined in claim 18, wherein the engine body has a plurality of first stud bolts disposed around the exhaust port in symmetric relation to one another about a center axis of the exhaust port and projecting upwardly from the engine body for connection of the first end of the exhaust pipe relative to the exhaust port, wherein the muffler has a plurality of second stud bolts disposed symmetrically with one another and projecting perpendicularly from the inclined bottom wall portion of the muffler for connection of the second end of the exhaust pipe relative to the muffler, and wherein each of the first stud bolts and a corresponding one of the second stud bolts are out of vertical alignment with each other and extend at an angle to each other.

22. The muffler unit as defined in claim 21, wherein the triangular space has a large end and a small end opposite to the large end, and wherein each of the second stud bolts is offset from a corresponding one of the first stud bolts in a direction toward the large end of the triangular space.

* * * * *